US012239211B2

(12) United States Patent
Lotti

(10) Patent No.: US 12,239,211 B2
(45) **Date of Patent: *Mar. 4, 2025**

(54) APPLICATOR FOR ARTIFICIAL LASH EXTENSIONS

(71) Applicant: Lashify, Inc., North Hollywood, CA (US)

(72) Inventor: Sahara Lotti, North Hollywood, CA (US)

(73) Assignee: Lashify, Inc., North Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,006

(22) Filed: Jul. 19, 2023

(65) Prior Publication Data

US 2023/0354986 A1 Nov. 9, 2023

Related U.S. Application Data

(60) Continuation of application No. 17/669,281, filed on Feb. 10, 2022, now Pat. No. 11,832,710, which is a (Continued)

(51) Int. Cl.
*A45D 44/00* (2006.01)
*A41G 5/02* (2006.01)
*B25B 9/02* (2006.01)

(52) U.S. Cl.
CPC ............... *A45D 44/00* (2013.01); *A41G 5/02* (2013.01); *B25B 9/02* (2013.01); *A45D 2200/05* (2013.01); *A45D 2200/10* (2013.01)

(58) Field of Classification Search
CPC ....... A41G 5/02; A45C 11/08; A45C 2200/05; A45C 2200/10; A45C 2200/25
See application file for complete search history.

(56) References Cited

U.S. PATENT DOCUMENTS 232,595 A 9/1880 Hanisch
783,924 A 2/1905 Boeehm
(Continued)

FOREIGN PATENT DOCUMENTS

CA 216492 A 3/1922
CA 2904764 A1 9/2014
(Continued)

OTHER PUBLICATIONS

Youtube: "FalseLashes, Falscara by: KISS," Dec. 23, 2019, 1 Page, [Retrieved on Apr. 4, 2023] Retrieved from URL: https://www.youtube.com/watch?v=cQfRFdZa1zE.
(Continued)

*Primary Examiner* — Rachel R Steitz
*Assistant Examiner* — Brianne E Kalach
(74) *Attorney, Agent, or Firm* — Lowenstein Sandler LLP

(57) ABSTRACT

A kit includes artificial lash extensions that attach to an underside of natural eyelashes in an arrangement adjacent to one another. The kit includes a storage case designed to releasably hold the artificial lash extensions, and an applicator having a pair of opposing arms that are joined to each other at a proximal end of each arm. Each arm includes a first section having the proximal end of the arm, a second section positioned between and connected to the first section and a third section of the arm, and the third section having a first end portion and a second end portion. The third section defines a curvature between the first end portion and the second end portion. The third sections of the applicator are designed to grasp artificial hairs of an artificial lash extension of the plurality of artificial lash extensions.

16 Claims, 13 Drawing Sheets

Related U.S. Application Data continuation of application No. 16/867,391, filed on May 5, 2020, now Pat. No. 11,278,102, which is a division of application No. 15/968,453, filed on May 1, 2018, now Pat. No. 10,638,826, which is a continuation of application No. PCT/US2017/067513, filed on Dec. 20, 2017.

(60) Provisional application No. 62/436,585, filed on Dec. 20, 2016.

(56) References Cited

U.S. PATENT DOCUMENTS

| | | | | | |
|---|---|---|---|---|---|
| 834,683 | A | | 10/1906 | Severin | |
| 994,619 | A | | 6/1911 | Taylor | |
| 1,021,063 | A | | 3/1912 | Miller | |
| 1,450,259 | A | | 4/1923 | Charles | |
| 1,657,497 | A | | 1/1928 | Cichon | |
| 1,831,801 | A | | 11/1931 | Birk | |
| 1,897,747 | A | | 2/1933 | Birk | |
| 1,920,401 | A | | 8/1933 | Kahn | |
| 1,987,931 | A | | 1/1935 | Jacob | |
| 2,004,046 | A | | 6/1935 | Glaser et al. | |
| 2,013,011 | A | | 9/1935 | Sheldon | |
| D101,791 | S | | 11/1936 | Rauh | |
| 2,079,256 | A | | 5/1937 | Kaiser | |
| D129,526 | S | | 9/1941 | Hanisch | |
| 2,268,082 | A | | 12/1941 | Phillips, Sr. | |
| 2,323,595 | A | | 7/1943 | Hanisch | |
| 2,392,694 | A | | 1/1946 | Rector | |
| 2,421,432 | A | | 6/1947 | Phillips | |
| D154,227 | S | | 6/1949 | Alvizua | |
| D155,559 | S | | 10/1949 | Tillmann | |
| 2,618,279 | A | | 11/1952 | Reiffert | |
| 2,630,516 | A | | 3/1953 | Rausch et al. | |
| 2,812,768 | A | | 11/1957 | Giuliano | |
| D189,888 | S | | 3/1961 | Tapper | |
| 3,016,059 | A | | 1/1962 | Hutton | |
| 3,032,042 | A | | 5/1962 | Borg | |
| 3,032,342 | A | | 5/1962 | Glass | |
| 3,174,321 | A | | 3/1965 | Williams | |
| 3,245,416 | A | | 4/1966 | Victor | |
| 3,266,500 | A | | 8/1966 | Weld | |
| 3,295,534 | A | | 1/1967 | Jess | |
| 3,306,139 | A | | 2/1967 | Brackett | |
| 3,315,689 | A | * | 4/1967 | Melik | A41G 5/02 206/229 |
| 3,339,561 | A | | 9/1967 | Brickner | |
| 3,343,552 | A | | 9/1967 | Steffen | |
| D210,180 | S | | 2/1968 | Solomon | |
| 3,392,727 | A | | 7/1968 | Hanlon | |
| D213,239 | S | | 1/1969 | Flewwellin | |
| 3,447,540 | A | | 6/1969 | Osher | |
| 3,454,015 | A | | 7/1969 | Udes | |
| 3,461,886 | A | | 8/1969 | Bau | |
| D215,985 | S | | 11/1969 | Silson | |
| 3,478,754 | A | | 11/1969 | Martin, Jr. | |
| 3,491,775 | A | | 1/1970 | Aylott | |
| 3,516,423 | A | | 6/1970 | Seidler | |
| 3,547,135 | A | | 12/1970 | Roos | |
| 3,557,653 | A | | 1/1971 | Kim | |
| D219,854 | S | | 2/1971 | Howard | |
| 3,561,454 | A | | 2/1971 | O'Connell | |
| D222,518 | S | | 10/1971 | Brittain | |
| 3,625,229 | A | | 12/1971 | Silson | |
| 3,645,281 | A | | 2/1972 | Seidler | |
| 3,670,742 | A | | 6/1972 | Weaner | |
| 3,703,180 | A | | 11/1972 | Aylott | |
| 3,818,784 | A | | 6/1974 | McClure | |
| 3,828,803 | A | | 8/1974 | Windsor | |
| 3,833,007 | A | | 9/1974 | Jacobs | |
| 3,900,038 | A | | 8/1975 | Masters | |
| D240,769 | S | | 7/1976 | Bowman | |
| 3,968,807 | A | | 7/1976 | Kraicer | |
| 3,970,092 | A | | 7/1976 | Nelson | |
| 3,970,992 | A | | 7/1976 | Boothroyd | |
| 3,971,392 | A | | 7/1976 | Brehmer | |
| 3,980,092 | A | | 9/1976 | Garufi | |
| 3,982,313 | A | | 9/1976 | Nelson, Jr. | |
| 4,016,889 | A | | 4/1977 | Cowles | |
| 4,018,336 | A | | 4/1977 | Aylott | |
| 4,029,111 | A | | 6/1977 | Barton | |
| 4,049,006 | A | | 9/1977 | Saunders | |
| 4,163,535 | A | | 8/1979 | Austin | |
| 4,168,713 | A | | 9/1979 | Agiotis | |
| 4,203,518 | A | | 5/1980 | Current | |
| 4,205,693 | A | | 6/1980 | Mallouf | |
| 4,225,693 | A | | 9/1980 | McCormick | |
| 4,254,772 | A | | 3/1981 | McNamee | |
| 4,254,784 | A | | 3/1981 | Nelson | |
| 4,284,092 | A | | 8/1981 | Auretta | |
| 4,296,765 | A | | 10/1981 | Bachtell | |
| D261,601 | S | | 11/1981 | Kettlestrings | |
| 4,299,242 | A | | 11/1981 | Choe | |
| 4,360,033 | A | | 11/1982 | Schmehling | |
| D269,820 | S | | 7/1983 | Bisson | |
| 4,395,824 | A | | 8/1983 | Puro | |
| D270,551 | S | | 9/1983 | Thayer | |
| 4,458,701 | A | | 7/1984 | Holland | |
| 4,509,539 | A | | 4/1985 | Alfieri | |
| D280,354 | S | | 8/1985 | Bakic | |
| D281,259 | S | | 11/1985 | Hensley | |
| D281,825 | S | | 12/1985 | Bakic | |
| 1,600,029 | A | | 7/1986 | Ueberschaar | |
| 4,697,856 | A | | 10/1987 | Abraham | |
| 4,739,777 | A | | 4/1988 | Nelson | |
| 4,761,028 | A | | 8/1988 | Dulebohn | |
| 4,767,492 | A | | 8/1988 | Fukusima | |
| D298,070 | S | | 10/1988 | Ferrari | |
| 4,784,713 | A | | 11/1988 | Van Nieulande | |
| D299,561 | S | | 1/1989 | Bakic | |
| D301,371 | S | | 5/1989 | Kaprelian | |
| D302,602 | S | | 8/1989 | Bakic | |
| 4,865,057 | A | | 9/1989 | Braun | |
| 4,934,387 | A | | 6/1990 | Megna | |
| 4,964,428 | A | | 10/1990 | Lamatrice | |
| D314,066 | S | | 1/1991 | Bakic | |
| 5,003,467 | A | | 3/1991 | Donaldson et al. | |
| 5,010,914 | A | | 4/1991 | Merges | |
| D318,346 | S | | 7/1991 | Bakic | |
| 5,033,626 | A | | 7/1991 | Platti | |
| 5,072,745 | A | | 12/1991 | Cheh | |
| 5,082,010 | A | | 1/1992 | Skaryd | |
| 5,117,846 | A | | 6/1992 | Finamore | |
| D328,246 | S | | 7/1992 | Nottingham | |
| 5,154,195 | A | | 10/1992 | Irisawa | |
| D342,671 | S | | 12/1993 | Elliott | |
| D343,340 | S | | 1/1994 | Frye, Jr. | |
| 5,307,826 | A | | 5/1994 | Iosilevich | |
| D348,219 | S | | 6/1994 | Goldberg | |
| 5,322,166 | A | | 6/1994 | Crowther | |
| 5,368,052 | A | | 11/1994 | Finamore | |
| 5,377,700 | A | | 1/1995 | Harris | |
| D358,312 | S | | 5/1995 | Keenan | |
| D358,908 | S | | 5/1995 | Rawski | |
| 5,411,775 | A | | 5/1995 | Wilson | |
| 5,419,345 | A | | 5/1995 | Kadymir | |
| D359,583 | S | | 6/1995 | Abbo | |
| D368,495 | S | | 4/1996 | Rypinski | |
| 5,533,529 | A | | 7/1996 | Ohno | |
| 5,547,529 | A | | 8/1996 | Woolf | |
| D373,726 | S | | 9/1996 | Power | |
| 5,571,543 | A | | 11/1996 | Song | |
| D379,923 | S | | 6/1997 | De Baschmakoff | |
| D380,616 | S | | 7/1997 | Leslie | |
| D382,198 | S | | 8/1997 | Mulhauser | |
| D386,808 | S | | 11/1997 | Litton | |
| D387,483 | S | | 12/1997 | Sloan | |
| D388,549 | S | | 12/1997 | Mouyiaris | |
| 5,746,232 | A | | 5/1998 | Martin | |
| 5,765,571 | A | | 6/1998 | Dinnel | |
| D397,040 | S | | 8/1998 | Bakic | |
| 5,813,418 | A | | 9/1998 | Pillars | |
| D403,922 | S | | 1/1999 | Terracciano | |

(56) References Cited

U.S. PATENT DOCUMENTS

| | | | |
|---|---|---|---|
| D404,531 | S | 1/1999 | Bakic |
| 5,894,846 | A | 4/1999 | Gang |
| 5,896,996 | A | 4/1999 | Chuang |
| D411,649 | S | 6/1999 | Bakic |
| 5,944,028 | A | 8/1999 | Gebhard |
| D418,018 | S | 12/1999 | Winsted |
| D418,253 | S | 12/1999 | Bakic |
| 6,003,467 | A | 12/1999 | Shelton-Ferrell |
| 6,016,814 | A | 1/2000 | Elliott |
| 6,019,107 | A | 2/2000 | Overmyer |
| 6,029,674 | A | 2/2000 | Han |
| 6,032,609 | A | 3/2000 | Luoma |
| 6,035,861 | A | 3/2000 | Copello |
| 6,092,291 | A | 7/2000 | Cendoma |
| 6,109,274 | A | 8/2000 | Ingersoll |
| D437,086 | S | 1/2001 | Dickert |
| 6,174,321 | B1 | 1/2001 | Webb |
| 6,182,839 | B1 | 2/2001 | Robbins |
| D442,304 | S | 5/2001 | Huang |
| 6,230,715 | B1 | 5/2001 | Cho |
| D443,471 | S | 6/2001 | Lillelund |
| 6,247,476 | B1 | 6/2001 | Sartena |
| 6,257,250 | B1 | 7/2001 | Sartena |
| 6,265,010 | B1 | 7/2001 | Franco |
| D448,927 | S | 10/2001 | Vazquez |
| 6,302,115 | B1 | 10/2001 | Sartena |
| 6,308,716 | B1 | 10/2001 | Han |
| D452,151 | S | 12/2001 | Scott |
| 6,325,071 | B1 | 12/2001 | Butcher |
| D454,981 | S | 3/2002 | Lamagna |
| D456,077 | S | 4/2002 | Etter |
| D456,097 | S | 4/2002 | Lamagna |
| D458,413 | S | 6/2002 | Boilen |
| 6,405,736 | B2 | 6/2002 | Townsend |
| 6,439,406 | B1 | 8/2002 | Duhon |
| D463,280 | S | 9/2002 | Brozell |
| D463,744 | S | 10/2002 | Brozell |
| D464,565 | S | 10/2002 | Weinstein |
| D464,877 | S | 10/2002 | Weinstein |
| 6,471,515 | B2 | 10/2002 | Feuer |
| D467,800 | S | 12/2002 | Chen |
| 6,494,212 | B1 | 12/2002 | Yamakoshi |
| 6,530,379 | B2 | 3/2003 | Iosilevich |
| D472,675 | S | 4/2003 | Lamagna |
| D472,810 | S | 4/2003 | Gelardi |
| D473,106 | S | 4/2003 | Scherer |
| 6,561,197 | B2 | 5/2003 | Harrison |
| 6,567,640 | B2 | 5/2003 | Ishikawa |
| D475,616 | S | 6/2003 | Lambrecht |
| 6,581,609 | B2 | 6/2003 | Ott |
| D479,365 | S | 9/2003 | Todeschini |
| D480,864 | S | 10/2003 | Sayers |
| D481,946 | S | 11/2003 | Nicholson |
| D481,952 | S | 11/2003 | Orsomando |
| D482,495 | S | 11/2003 | Jackel-Marken |
| D482,928 | S | 12/2003 | Liu |
| D482,934 | S | 12/2003 | Liu |
| D483,232 | S | 12/2003 | Liu |
| D483,633 | S | 12/2003 | Jansson |
| D483,909 | S | 12/2003 | Todeschini |
| D485,359 | S | 1/2004 | McMichael |
| 6,688,315 | B1 | 2/2004 | Harrison |
| 6,691,714 | B1 | 2/2004 | Yaguchi |
| 6,708,696 | B2 | 3/2004 | Ferguson |
| D488,353 | S | 4/2004 | Govrik |
| D488,618 | S | 4/2004 | Wekstein |
| D490,932 | S | 6/2004 | Mammone |
| D491,336 | S | 6/2004 | Cecere |
| D495,834 | S | 9/2004 | Todeschini |
| D496,759 | S | 9/2004 | Rodriguez |
| 6,789,551 | B2 | 9/2004 | Iosilevich |
| 6,820,625 | B2 | 11/2004 | Park |
| D501,580 | S | 2/2005 | Sugawara |
| D506,573 | S | 6/2005 | de Grandcourt |
| D507,678 | S | 7/2005 | Lamagna |
| 6,935,348 | B2 | 8/2005 | Gold |
| 6,935,349 | B2 | 8/2005 | Nicot |
| D509,942 | S | 9/2005 | Connolly |
| D512,913 | S | 12/2005 | Gauthier |
| 6,973,931 | B1 | 12/2005 | King |
| 6,981,814 | B2 | 1/2006 | Geardino |
| D515,242 | S | 2/2006 | Cho |
| D515,742 | S | 2/2006 | Anderson et al. |
| D516,247 | S | 2/2006 | Merheje |
| 7,000,775 | B2 | 2/2006 | Gelardi |
| 7,036,518 | B2 | 5/2006 | Park |
| D522,376 | S | 6/2006 | Hales |
| 7,128,213 | B2 | 10/2006 | Tung et al. |
| D532,891 | S | 11/2006 | Buthier |
| D533,650 | S | 12/2006 | Ohta |
| 7,147,127 | B2 | 12/2006 | Lepke et al. |
| D534,426 | S | 1/2007 | Bakic |
| 7,159,720 | B2 | 1/2007 | Pearson |
| 7,168,432 | B1 | 1/2007 | Brumfield |
| D537,208 | S | 2/2007 | Shaljian |
| D540,112 | S | 4/2007 | Nichols |
| D543,662 | S | 5/2007 | Bivona |
| D543,663 | S | 5/2007 | Bivona et al. |
| D543,815 | S | 6/2007 | Metcalf |
| D543,850 | S | 6/2007 | Legros |
| D544,148 | S | 6/2007 | Bivona |
| D544,202 | S | 6/2007 | Markfelder |
| D545,396 | S | 6/2007 | Casey |
| 7,228,863 | B2 | 6/2007 | Dumler |
| D546,002 | S | 7/2007 | Bowen |
| D547,940 | S | 8/2007 | Sandy |
| D559,457 | S | 1/2008 | Garland |
| D561,045 | S | 2/2008 | Lee |
| D561,357 | S | 2/2008 | Leclercq |
| D561,942 | S | 2/2008 | Khubani |
| 7,331,351 | B1 | 2/2008 | Asai |
| D563,157 | S | 3/2008 | Bouveret |
| D563,616 | S | 3/2008 | Lynde |
| D563,728 | S | 3/2008 | Welch, III |
| 7,343,921 | B2 | 3/2008 | Salinas |
| D569,041 | S | 5/2008 | Azoulay |
| D569,553 | S | 5/2008 | Cho |
| 7,374,048 | B2 | 5/2008 | Mazurek |
| D571,543 | S | 6/2008 | Sungadi |
| D573,306 | S | 7/2008 | Yoo |
| D573,308 | S | 7/2008 | Wittke-Kothe |
| D575,904 | S | 8/2008 | Iqbal |
| D579,059 | S | 10/2008 | Chan |
| 7,469,701 | B1 | 12/2008 | Bernard |
| D584,449 | S | 1/2009 | Shaljian |
| D587,529 | S | 3/2009 | Pratt |
| D588,746 | S | 3/2009 | Ross |
| 7,501,178 | B2 | 3/2009 | Sato |
| D591,599 | S | 5/2009 | Okin |
| D592,917 | S | 5/2009 | Jalet et al. |
| D592,923 | S | 5/2009 | Konopka |
| 7,533,676 | B2 | 5/2009 | Sthair |
| D595,054 | S | 6/2009 | Whitaker |
| 7,543,718 | B2 | 6/2009 | Simon |
| D600,441 | S | 9/2009 | Estrada |
| D602,354 | S | 10/2009 | Dibnah |
| 7,600,519 | B2 | 10/2009 | Dinh |
| D604,579 | S | 11/2009 | Robinson |
| 7,610,921 | B2 | 11/2009 | Gold |
| D605,514 | S | 12/2009 | Weber |
| 7,637,265 | B2 | 12/2009 | Funatsu et al. |
| D607,332 | S | 1/2010 | Huntington |
| D615,290 | S | 5/2010 | Heffner |
| D617,187 | S | 6/2010 | Murray |
| D617,943 | S | 6/2010 | Bouix |
| D618,078 | S | 6/2010 | Cripps |
| 7,748,391 | B2 | 7/2010 | Vance |
| D627,103 | S | 11/2010 | Cho |
| 7,836,899 | B2 | 11/2010 | Sugai |
| D631,606 | S | 1/2011 | Chen |
| 7,896,192 | B2 | 3/2011 | Conley |
| D636,127 | S | 4/2011 | Allison et al. |
| D638,733 | S | 5/2011 | Sullivan |
| 7,938,128 | B2 | 5/2011 | Gueret |

(56) References Cited

U.S. PATENT DOCUMENTS

| | | | |
|---|---|---|---|
| D639,196 | S | 6/2011 | Sullivan |
| D640,005 | S | 6/2011 | Lee |
| D640,834 | S | 6/2011 | Chen |
| D641,106 | S | 7/2011 | Williams |
| 8,015,980 | B2 | 9/2011 | Rabe |
| 8,025,065 | B2 | 9/2011 | Guliker |
| 8,042,553 | B2 | 10/2011 | Paris |
| D647,799 | S | 11/2011 | Dunwoody |
| 8,061,367 | B2 | 11/2011 | Rabe |
| D650,669 | S | 12/2011 | Dunwoody |
| D650,670 | S | 12/2011 | Dunwoody |
| D651,082 | S | 12/2011 | Dunwoody |
| 8,113,218 | B2 | 2/2012 | Nguyen |
| 8,127,774 | B2 | 3/2012 | Dinh |
| D657,496 | S | 4/2012 | Flatt |
| D657,696 | S | 4/2012 | Floyd |
| D659,330 | S | 5/2012 | Davis |
| 8,171,943 | B2 | 5/2012 | Hamano |
| 8,186,361 | B2 | 5/2012 | Hampton |
| D661,185 | S | 6/2012 | Battat |
| D661,599 | S | 6/2012 | Floyd |
| 8,191,556 | B2 | 6/2012 | Betts |
| 8,196,591 | B2 | 6/2012 | Lee |
| 8,205,761 | B2 | 6/2012 | Stull, Sr. |
| D663,113 | S | 7/2012 | Simms |
| D664,011 | S | 7/2012 | Affonso |
| 8,225,800 | B2 | 7/2012 | Byrne |
| D669,223 | S | 10/2012 | Lee |
| D670,030 | S | 10/2012 | Nguyen |
| D673,325 | S | 12/2012 | Martines |
| 8,342,186 | B2 | 1/2013 | Freelove |
| 8,347,896 | B2 | 1/2013 | Liao |
| D679,590 | S | 4/2013 | Stull, Sr. |
| D679,591 | S | 4/2013 | Stull, Sr. |
| D679,592 | S | 4/2013 | Stull, Sr. |
| D679,595 | S | 4/2013 | Stull, Sr. |
| D679,596 | S | 4/2013 | Stull, Sr. |
| D682,103 | S | 5/2013 | Jedlicka |
| D682,688 | S | 5/2013 | Murray |
| 8,434,500 | B2 | 5/2013 | Alex |
| D686,495 | S | 7/2013 | Murray |
| D690,419 | S | 9/2013 | Porat |
| 8,528,571 | B2 | 9/2013 | Costa |
| 8,567,640 | B1 | 10/2013 | Johnson-Lofton |
| 8,578,946 | B2 | 11/2013 | Ellery |
| 8,590,543 | B2 | 11/2013 | Goff et al. |
| 8,596,284 | B2 | 12/2013 | Byme |
| 8,616,223 | B2 | 12/2013 | Rabe |
| D698,078 | S | 1/2014 | Purizhansky |
| 8,657,170 | B2 | 2/2014 | Martinez |
| D700,799 | S | 3/2014 | Ludeman |
| 8,672,377 | B2 | 3/2014 | Ina |
| D702,510 | S | 4/2014 | Segal |
| 8,701,685 | B2 | 4/2014 | Chipman |
| D707,392 | S | 6/2014 | Yu |
| D707,556 | S | 6/2014 | Kawamura |
| 8,739,803 | B2 | 6/2014 | Freelove |
| 8,752,562 | B2 | 6/2014 | Dinh |
| D709,129 | S | 7/2014 | Moertl |
| D711,227 | S | 8/2014 | Sheikh |
| D713,217 | S | 9/2014 | Micara-Sartori |
| D714,494 | S | 9/2014 | Vasquez |
| 8,826,919 | B2 | 9/2014 | Dinh |
| D716,498 | S | 10/2014 | Wolff |
| D717,038 | S | 11/2014 | Lee |
| D717,536 | S | 11/2014 | Gupta |
| D718,498 | S | 11/2014 | Gu |
| 8,875,718 | B2 | 11/2014 | Dinh |
| 8,881,741 | B1 | 11/2014 | Mattson |
| 8,881,744 | B2 | 11/2014 | Mckinstry |
| D718,901 | S | 12/2014 | Parker |
| 8,939,159 | B2 | 1/2015 | Yeo |
| 8,967,158 | B2 | 3/2015 | Sanbonmatsu |
| 9,004,076 | B2 | 4/2015 | Le |
| 9,004,299 | B2 | 4/2015 | Hardin |
| 9,027,568 | B2 | 5/2015 | Lee |
| 9,044,076 | B2 | 6/2015 | Temple |
| 9,078,480 | B2 | 7/2015 | Beschta |
| 9,107,461 | B2 | 8/2015 | Martins |
| D738,579 | S | 9/2015 | Owens |
| D738,611 | S | 9/2015 | Gupta |
| 9,149,083 | B1 | 10/2015 | Dinh |
| 9,155,345 | B2 | 10/2015 | Nisim |
| 9,179,722 | B2 | 11/2015 | Le |
| 9,185,943 | B2 | 11/2015 | Merszei |
| D746,046 | S | 12/2015 | Lee |
| D746,514 | S | 12/2015 | Lambridis |
| 9,215,901 | B1 | 12/2015 | Schroeder |
| 9,254,012 | B2 | 2/2016 | Pham |
| D751,904 | S | 3/2016 | Landrum |
| 9,277,777 | B2 | 3/2016 | Lee |
| 9,284,111 | B2 | 3/2016 | Huang |
| D753,455 | S | 4/2016 | Hyma |
| D753,881 | S | 4/2016 | Hussain |
| 9,314,085 | B2 | 4/2016 | Hatch |
| D755,577 | S | 5/2016 | Segal |
| D757,274 | S | 5/2016 | Gelb |
| D758,009 | S | 5/2016 | Berkos |
| 9,339,072 | B2 | 5/2016 | Kenna |
| 9,351,752 | B2 | 5/2016 | Slavin |
| D761,489 | S | 7/2016 | Krakovszki |
| D762,433 | S | 8/2016 | Yang |
| D764,688 | S | 8/2016 | Robinson |
| D765,909 | S | 9/2016 | Marchica |
| 9,433,421 | B2 | 9/2016 | Ueno et al. |
| 9,439,465 | B2 | 9/2016 | Ott |
| 9,451,800 | B2 | 9/2016 | Dinh |
| 9,456,646 | B2 | 10/2016 | Calina |
| 9,462,837 | B2 | 10/2016 | Ngo |
| 9,468,245 | B2 | 10/2016 | Woods |
| D771,318 | S | 11/2016 | Taff |
| 9,486,025 | B1 | 11/2016 | Dinh |
| 9,504,285 | B2 | 11/2016 | Lin |
| D773,915 | S | 12/2016 | Barakat |
| D775,270 | S | 12/2016 | Moffat |
| 9,516,908 | B2 | 12/2016 | Miyatake et al. |
| 9,565,883 | B2 | 2/2017 | Dinh |
| D780,994 | S | 3/2017 | Hardwick |
| 9,596,898 | B2 | 3/2017 | Seawright |
| D783,899 | S | 4/2017 | Roh |
| D783,901 | S | 4/2017 | Kim |
| D784,615 | S | 4/2017 | Choi |
| 9,622,527 | B2 | 4/2017 | Nguyen |
| D788,556 | S | 6/2017 | James |
| 9,730,481 | B2 | 8/2017 | Uresti |
| D796,582 | S | 9/2017 | Beard |
| D800,966 | S | 10/2017 | Silva |
| 9,815,655 | B2 | 11/2017 | Crapet et al. |
| D805,135 | S | 12/2017 | Beard |
| D806,315 | S | 12/2017 | Hardwick |
| 9,833,028 | B2 | 12/2017 | Jang |
| 9,848,661 | B2 | 12/2017 | Harris |
| 9,848,662 | B2 | 12/2017 | Dinh |
| D810,534 | S | 2/2018 | Liu |
| D810,543 | S | 2/2018 | Astradsson |
| D811,872 | S | 3/2018 | Wu |
| D812,303 | S | 3/2018 | Pascullo |
| D814,107 | S | 3/2018 | Lotti |
| D814,260 | S | 4/2018 | Dhubb |
| 9,930,919 | B1 | 4/2018 | Branker |
| 9,946,169 | B2 | 4/2018 | Endo |
| D817,132 | S | 5/2018 | Yang |
| D819,891 | S | 6/2018 | Kenig et al. |
| 9,993,373 | B2 | 6/2018 | Nassif |
| D823,538 | S | 7/2018 | Ruggaber |
| D823,683 | S | 7/2018 | Caldwell |
| D825,333 | S | 8/2018 | Ozamiz |
| D826,019 | S | 8/2018 | Keehner |
| D828,013 | S | 9/2018 | van Wijngaarden |
| D828,014 | S | 9/2018 | van Wijngaarden |
| D828,629 | S | 9/2018 | Hussain |
| D829,381 | S | 9/2018 | Kim |
| D830,170 | S | 10/2018 | Holmes |
| D832,701 | S | 11/2018 | Oates |

(56) References Cited

U.S. PATENT DOCUMENTS

| | | | | |
|---|---|---|---|---|
| D832,702 | S | 11/2018 | Oates | |
| D835,465 | S | 12/2018 | Son | |
| D836,432 | S | 12/2018 | Riedel | |
| 10,149,528 | B2 | 12/2018 | Erickson | |
| D836,943 | S | 1/2019 | Klieman | |
| D837,653 | S | 1/2019 | Meranus | |
| D840,104 | S | 2/2019 | Hussain | |
| 10,264,837 | B2 | 4/2019 | Park | |
| D847,631 | S | 5/2019 | Villbrandt | |
| D847,632 | S | 5/2019 | Villbrandt | |
| D848,795 | S | 5/2019 | Butler | |
| D850,715 | S | 6/2019 | Lotti | |
| D852,412 | S | 6/2019 | Grund | |
| 10,362,823 | B1 | 7/2019 | Hill | |
| D862,796 | S | 10/2019 | Jin Kim | |
| D863,419 | S | 10/2019 | Oguma | |
| D863,679 | S | 10/2019 | Lotti | |
| 10,433,607 | B2 | 10/2019 | Ahn | |
| D867,664 | S | 11/2019 | Lotti | |
| D867,668 | S | 11/2019 | Lotti | |
| 10,479,566 | B2 | 11/2019 | Doyle | |
| D871,673 | S | 12/2019 | Qureshi | |
| 10,532,861 | B2 | 1/2020 | Kimmel | |
| D877,416 | S | 3/2020 | Lotti | |
| D884,273 | S | 5/2020 | Liu | |
| 10,638,826 | B2 * | 5/2020 | Lotti | B25B 9/02 |
| 10,660,388 | B2 | 5/2020 | Lotti | |
| D887,664 | S | 6/2020 | Liao et al. | |
| D890,430 | S | 7/2020 | Lotti | |
| 10,721,984 | B2 | 7/2020 | Lotti | |
| D895,201 | S | 9/2020 | Lotti | |
| D895,958 | S | 9/2020 | Guo | |
| 10,791,782 | B2 | 10/2020 | Nakamura | |
| 10,892,048 | B2 | 1/2021 | Reddy et al. | |
| D909,680 | S | 2/2021 | Hussain | |
| D914,965 | S | 3/2021 | Lotti | |
| D917,153 | S | 4/2021 | Denei | |
| D918,475 | S | 5/2021 | Hu | |
| D920,400 | S | 5/2021 | Saito | |
| D920,465 | S | 5/2021 | Bould | |
| D926,372 | S | 7/2021 | Liang | |
| D930,788 | S | 9/2021 | Roth | |
| D932,101 | S | 9/2021 | Davis | |
| D937,482 | S | 11/2021 | Kim | |
| 11,172,749 | B2 | 11/2021 | Lotti | |
| 11,219,260 | B2 | 1/2022 | Lotti | |
| 11,234,472 | B2 | 2/2022 | Lotti | |
| 11,253,020 | B2 | 2/2022 | Lotti | |
| D952,258 | S | 5/2022 | Lotti | |
| 11,330,855 | B2 | 5/2022 | Lotti | |
| 11,330,856 | B2 | 5/2022 | Lotti | |
| D955,635 | S | 6/2022 | Lotti | |
| D955,645 | S | 6/2022 | Lotti | |
| D961,845 | S | 8/2022 | Wang | |
| 11,432,608 | B2 | 9/2022 | Lotti | |
| 11,446,017 | B2 | 9/2022 | Klassen et al. | |
| 11,466,182 | B2 * | 10/2022 | Lotti | A61K 8/97 |
| D971,505 | S | 11/2022 | Lotti | |
| D971,506 | S | 11/2022 | Lotti | |
| D972,218 | S | 12/2022 | Liu | |
| D980,521 | S | 3/2023 | Lotti | |
| D984,050 | S | 4/2023 | Lotti | |
| D987,891 | S | 5/2023 | Lotti | |
| D995,914 | S | 8/2023 | Lotti | |
| D1,006,319 | S | 11/2023 | Lotti | |
| D1,008,558 | S | 12/2023 | Liu | |
| 11,832,710 | B2 * | 12/2023 | Lotti | A41G 5/02 |
| D1,013,277 | S | 1/2024 | Lotti | |
| 2001/0023699 | A1 | 9/2001 | Matthews | |
| 2001/0035192 | A1 | 11/2001 | Townsend | |
| 2001/0037813 | A1 | 11/2001 | Ra | |
| 2002/0056465 | A1 | 5/2002 | Shin | |
| 2002/0094507 | A1 | 7/2002 | Feuer | |
| 2002/0103421 | A1 | 8/2002 | Putrino et al. | |
| 2002/0114657 | A1 | 8/2002 | Gueret | |
| 2002/0127514 | A1 | 9/2002 | Dietrich | |
| 2002/0198597 | A1 | 12/2002 | Godfrey | |
| 2003/0005941 | A1 | 1/2003 | Losilevich | |
| 2003/0111467 | A1 | 6/2003 | Norman | |
| 2003/0155317 | A1 | 8/2003 | McNeeley | |
| 2003/0226571 | A1 | 12/2003 | Rahman | |
| 2004/0011371 | A1 | 1/2004 | Harrison | |
| 2004/0011372 | A1 | 1/2004 | Park | |
| 2004/0051327 | A1 | 3/2004 | Yoon | |
| 2004/0079382 | A1 | 4/2004 | Profitt-Campbell | |
| 2004/0168696 | A1 | 9/2004 | Cox | |
| 2004/0173233 | A1 | 9/2004 | Tokko | |
| 2004/0211436 | A1 | 10/2004 | Knight | |
| 2005/0061341 | A1 | 3/2005 | Choe | |
| 2005/0098190 | A1 | 5/2005 | Kim | |
| 2005/0098191 | A1 | 5/2005 | Frazier | |
| 2005/0115581 | A1 | 6/2005 | Choi | |
| 2005/0166939 | A1 | 8/2005 | Stroud | |
| 2005/0194015 | A1 | 9/2005 | Watts | |
| 2005/0247326 | A1 | 11/2005 | Park | |
| 2005/0252517 | A1 | 11/2005 | Salinas | |
| 2005/0252518 | A1 | 11/2005 | Salinas | |
| 2006/0028040 | A1 | 2/2006 | Cohen et al. | |
| 2006/0065280 | A1 | 3/2006 | Cheung | |
| 2006/0065281 | A1 | 3/2006 | Kim | |
| 2006/0081267 | A1 | 4/2006 | Kuptiz | |
| 2006/0096609 | A1 | 5/2006 | Nwokola | |
| 2006/0124658 | A1 | 6/2006 | Coe | |
| 2006/0129187 | A1 | 6/2006 | Cho | |
| 2006/0142693 | A1 | 6/2006 | Kahen | |
| 2006/0175853 | A1 | 8/2006 | Anderson | |
| 2006/0180168 | A1 | 8/2006 | Dinnel | |
| 2006/0180171 | A1 | 8/2006 | Kim | |
| 2006/0266376 | A1 | 11/2006 | Basso | |
| 2007/0023062 | A1 | 2/2007 | McKinstry | |
| 2007/0050207 | A1 * | 3/2007 | Merszei | G09B 19/00 705/2 |
| 2007/0084749 | A1 | 4/2007 | Demelo | |
| 2007/0157941 | A1 | 7/2007 | Awad | |
| 2007/0157944 | A1 | 7/2007 | Catron | |
| 2007/0172264 | A1 | 7/2007 | An | |
| 2007/0199571 | A1 | 8/2007 | McCulloch | |
| 2007/0221240 | A1 | 9/2007 | Junsuh Lee | |
| 2007/0227550 | A1 | 10/2007 | Merszei | |
| 2007/0272263 | A1 | 11/2007 | Gold | |
| 2007/0272264 | A1 | 11/2007 | Byrne | |
| 2007/0295353 | A1 | 12/2007 | Dinh | |
| 2008/0017210 | A1 | 1/2008 | Eaton | |
| 2008/0196732 | A1 | 8/2008 | Merszei | |
| 2008/0223390 | A1 | 9/2008 | Brown | |
| 2008/0276949 | A1 | 11/2008 | Lee | |
| 2008/0283072 | A1 | 11/2008 | Sun | |
| 2009/0014023 | A1 | 1/2009 | Waters | |
| 2009/0026676 | A1 | 1/2009 | Kurita | |
| 2009/0028625 | A1 | 1/2009 | Bonneyrat | |
| 2009/0071490 | A1 | 3/2009 | Sthair | |
| 2009/0071492 | A1 | 3/2009 | Oh | |
| 2009/0178689 | A1 | 7/2009 | Navarro | |
| 2009/0217936 | A1 | 9/2009 | Sato | |
| 2009/0217939 | A1 | 9/2009 | Rabe | |
| 2009/0223534 | A1 | 9/2009 | Green | |
| 2009/0241973 | A1 | 10/2009 | Hampton | |
| 2009/0241979 | A1 | 10/2009 | Navarro | |
| 2009/0250956 | A1 | 10/2009 | Resnick | |
| 2009/0255547 | A1 | 10/2009 | Starks | |
| 2009/0266373 | A1 | 10/2009 | Kupitz | |
| 2009/0266376 | A1 | 10/2009 | Beschta | |
| 2010/0043816 | A1 | 2/2010 | Dix | |
| 2010/0065078 | A1 | 3/2010 | Reece | |
| 2010/0070526 | A1 | 3/2010 | Matias | |
| 2010/0127228 | A1 | 5/2010 | Xie | |
| 2010/0170526 | A1 | 7/2010 | Nguyen | |
| 2011/0079233 | A1 | 4/2011 | Cheh | |
| 2011/0079235 | A1 | 4/2011 | Reed | |
| 2011/0079236 | A1 | 4/2011 | Lee | |
| 2011/0121592 | A1 | 5/2011 | Cho | |
| 2011/0127228 | A1 | 6/2011 | Sagel | |
| 2011/0220136 | A1 | 9/2011 | Kang | |
| 2011/0226274 | A1 | 9/2011 | Turner | |

(56) References Cited

U.S. PATENT DOCUMENTS

2011/0240049 A1 10/2011 Kim
2011/0278869 A1 11/2011 Lee
2011/0290271 A1 12/2011 Rabe
2011/0290937 A1 12/2011 Salkeld
2012/0009002 A1 1/2012 Lo et al.
2012/0037177 A1 2/2012 Teater Makinen
2012/0055499 A1 3/2012 Sanbonmatsu
2012/0160258 A1 6/2012 Cruz et al.
2012/0160259 A1 6/2012 Nguyen
2012/0174939 A1 7/2012 Starks
2012/0180804 A1 7/2012 Hochi
2012/0266903 A1 10/2012 Devlin
2012/0305020 A1 12/2012 Byrne
2012/0318290 A1 12/2012 Kim
2013/0019889 A1 1/2013 Palmer-Rogers
2013/0032162 A1 2/2013 Major
2013/0042881 A1 2/2013 Mutchler
2013/0042884 A1 2/2013 Wilkinson
2013/0110032 A1 5/2013 Luzon
2013/0152960 A1 6/2013 Pays et al.
2013/0160783 A1 6/2013 Ahn
2013/0167855 A1 7/2013 Kupitz
2013/0167858 A1 7/2013 Lee
2013/0213431 A1 8/2013 Geva et al.
2013/0255706 A1 10/2013 Dinh
2013/0276807 A1 10/2013 Teater Makinen
2013/0298931 A1 11/2013 Samain
2013/0306089 A1 11/2013 Araujo Costa
2013/0306094 A1 11/2013 West
2013/0312781 A1 11/2013 Murphy
2013/0312782 A1 11/2013 Kindall
2013/0320025 A1 12/2013 Mazzetta
2013/0333714 A1 12/2013 Merszei
2014/0011372 A1 1/2014 Kato
2014/0060559 A1 3/2014 Lin
2014/0069451 A1 3/2014 Hwang
2014/0083447 A1 3/2014 Rabe
2014/0110304 A1 4/2014 Wu
2014/0116456 A1 5/2014 Palmer-Rogers
2014/0135914 A1 5/2014 Conant
2014/0216488 A1 8/2014 Dinh
2014/0332025 A1 11/2014 Kim
2015/0020840 A1 1/2015 Rabe
2015/0075549 A1 3/2015 Lee
2015/0114421 A1 4/2015 Pham
2015/0114422 A1 4/2015 Abraham
2015/0114423 A1 4/2015 Sanbonmatsu
2015/0128986 A1 5/2015 Stookey
2015/0136162 A1 5/2015 Brouillet
2015/0173442 A1* 6/2015 Raouf ...................... A41G 5/02
132/286
2015/0181967 A1 7/2015 Dinh
2015/0181968 A1 7/2015 Uresti
2015/0201691 A1 7/2015 Palmer-Rogers
2015/0201692 A1 7/2015 Hansen
2015/0216246 A1 8/2015 Ahn
2015/0230884 A1 8/2015 McDonald et al.
2015/0351467 A1 12/2015 Simoes
2016/0016702 A1 1/2016 Siskindovich
2016/0037847 A1 2/2016 Tavakoli
2016/0037848 A1 2/2016 Lee
2016/0050996 A1 2/2016 Kwon
2016/0058088 A1 3/2016 Le
2016/0088889 A1 3/2016 Kettavong
2016/0135531 A1 5/2016 Ezechukwu
2016/0166039 A1 6/2016 Luu
2016/0174645 A1 6/2016 Goldner
2016/0192724 A1 7/2016 Scott
2016/0192725 A1 7/2016 Merszei
2016/0206031 A1 7/2016 Stoka
2016/0219959 A1 8/2016 Chipman
2016/0286881 A1 10/2016 Ko
2016/0324241 A2 11/2016 Lee
2016/0324242 A1 11/2016 Hansen
2016/0345648 A1 12/2016 Miniello
2016/0353821 A1 12/2016 Calina
2016/0353861 A1 12/2016 Carey
2017/0000204 A1 1/2017 Wibowo
2017/0006947 A1 1/2017 Uresti
2017/0020219 A1 1/2017 Beschta
2017/0049172 A1 2/2017 Ahn
2017/0049173 A1 2/2017 Dinh
2017/0055615 A1 3/2017 Crocilla
2017/0079356 A1 3/2017 Dinh
2017/0079357 A1 3/2017 Dinh
2017/0079358 A1 3/2017 Dinh
2017/0112214 A1 4/2017 Ahn
2017/0112215 A1 4/2017 Dinh
2017/0112264 A1 4/2017 Park
2017/0127743 A1 5/2017 Nakamura
2017/0150763 A1 6/2017 Schroeder
2017/0208885 A1 7/2017 Alex
2017/0231309 A1 8/2017 Han
2017/0258163 A1 9/2017 Uresti
2017/0265550 A1 9/2017 Han
2017/0311667 A1 11/2017 Passariello
2017/0340041 A1 11/2017 Nguyen
2017/0347731 A1 12/2017 Chipman
2017/0358245 A1 12/2017 Dana
2017/0360134 A1 12/2017 Crocilla
2017/0360135 A1 12/2017 Ahn
2017/0360136 A1 12/2017 Ferrier
2018/0065779 A1 3/2018 Chiba
2018/0098591 A1 4/2018 Leeflang
2018/0160755 A1 6/2018 Hansen
2018/0235299 A1 8/2018 Stoka
2018/0242671 A1 8/2018 Merszei
2018/0242672 A1 8/2018 Lotti
2018/0242715 A1 8/2018 Lotti
2018/0352885 A1 12/2018 Kim
2018/0352886 A1 12/2018 Schroeder
2019/0133227 A1 5/2019 Le
2019/0191851 A1 6/2019 Esposito
2019/0254373 A1 8/2019 Kim
2019/0254374 A1 8/2019 Schroeder
2020/0093211 A1 3/2020 Lee
2020/0196694 A1 6/2020 Lotti
2020/0260839 A1 8/2020 Lotti
2020/0323324 A1 10/2020 Chang
2020/0323325 A1 10/2020 Kim et al.
2021/0030140 A1 2/2021 Chico
2021/0337949 A1 11/2021 Ardin
2022/0160094 A1 5/2022 Lyons et al.

FOREIGN PATENT DOCUMENTS

CA 2928299 A1 10/2016
CN 201146962 Y 11/2008
CN 102355833 A 2/2012
CN 302315323 2/2013
CN 102975141 A 3/2013
CN 202776481 U 3/2013
CN 103027410 A 4/2013
CN 103717108 A 4/2014
CN 103734961 A 4/2014
CN 203897379 U 10/2014
CN 303086463 1/2015
CN 104363790 A 2/2015
CN 204191855 U 3/2015
CN 205274180 U 6/2016
CN 304049505 S 2/2017
CN 304049506 S 2/2017
CN 106983203 A 7/2017
CN 304310042 S 10/2017
CN 304329374 S 10/2017
CN 304329375 S 10/2017
CN 304382151 S 12/2017
CN 304452297 1/2018
CN 304497372 S 2/2018
CN 207084233 U 3/2018
CN 304777737 S 8/2018
CN 304859863 S 10/2018
CN 304859864 S 10/2018
CN 305599881 S 2/2020

(56) References Cited

FOREIGN PATENT DOCUMENTS

| | | | | |
|---|---|---|---|---|
| CN | 305719777 | | | 4/2020 |
| CN | 305729159 | S | | 4/2020 |
| CN | 305738664 | | | 4/2020 |
| CN | 111418982 | A | | 7/2020 |
| CN | 305916370 | | | 7/2020 |
| DE | 950232 | C | | 10/1956 |
| EM | 006381257-0001 | | | 4/2019 |
| EM | 006381257-0002 | | | 4/2019 |
| EM | 006381257-0003 | | | 4/2019 |
| EP | 1839526 | A1 | | 10/2007 |
| EP | 1839526 | B1 | | 7/2009 |
| EP | 006381257 | | | 10/2014 |
| FR | 569600 | A | | 4/1924 |
| FR | 1435971 | A | | 4/1966 |
| FR | 1539430 | A | | 9/1968 |
| FR | 2785514 | A1 | | 5/2000 |
| FR | 2897760 | A1 | | 8/2007 |
| GB | 190218723 | A | | 11/1902 |
| GB | 102106 | A | | 11/1916 |
| GB | 1021063 | A | * | 2/1966 |
| GB | 1042020 | A | | 9/1966 |
| GB | 1263815 | A | | 2/1972 |
| GB | 1272616 | A | | 5/1972 |
| GB | 1307107 | A | | 2/1973 |
| GB | 2369712 | B | | 3/2004 |
| GB | 2450250 | A | | 12/2008 |
| GB | 2458230 | A | | 9/2009 |
| GB | 2458230 | B | | 5/2010 |
| GB | 2516622 | A | | 2/2015 |
| GB | 6024289 | | | 12/2017 |
| JP | S471395 | U | | 8/1972 |
| JP | S4721880 | U | | 11/1972 |
| JP | S484711 | U | | 1/1973 |
| JP | S484711 | Y1 | | 2/1973 |
| JP | S486937 | Y1 | | 2/1973 |
| JP | 48007948 | B | | 3/1973 |
| JP | S4833591 | U | | 4/1973 |
| JP | S4993157 | A | | 9/1974 |
| JP | S5383862 | A | | 7/1978 |
| JP | 3101488 | U | | 6/2004 |
| JP | 2007222271 | A | | 9/2007 |
| JP | 2009040718 | A | | 2/2009 |
| JP | 3155628 | U | | 11/2009 |
| JP | 3157680 | U | | 2/2010 |
| JP | 2010099141 | A | | 5/2010 |
| JP | 2010137329 | A | | 6/2010 |
| JP | 2011500979 | A | | 1/2011 |
| JP | 2011106066 | A | | 6/2011 |
| JP | 2011122288 | A | | 6/2011 |
| JP | 3170596 | U | | 9/2011 |
| JP | 2011177395 | A | | 9/2011 |
| JP | 3175232 | U | | 4/2012 |
| JP | 2015105447 | A | | 6/2015 |
| JP | 5823118 | B2 | | 11/2015 |
| JP | 3201846 | U | | 1/2016 |
| JP | 2016027220 | A | | 2/2016 |
| JP | 2016510841 | A | | 4/2016 |
| JP | 5955355 | B2 | | 7/2016 |
| JP | 2016163699 | A | | 9/2016 |
| JP | 2017012047 | A | | 1/2017 |
| JP | 6130571 | B1 | | 5/2017 |
| JP | 2018076626 | A | | 5/2018 |
| JP | 2019044277 | A | | 3/2019 |
| JP | 2019094588 | A | | 6/2019 |
| JP | 2019522125 | A | | 8/2019 |
| JP | 1671784 | S | | 11/2020 |
| JP | 2021151399 | A | | 9/2021 |
| KR | 200165452 | Y1 | | 2/2000 |
| KR | 200171517 | Y1 | | 3/2000 |
| KR | 200240234 | Y1 | | 10/2001 |
| KR | 200260653 | Y1 | | 1/2002 |
| KR | 20020065306 | A | | 8/2002 |
| KR | 200350229 | Y1 | | 5/2004 |
| KR | 100450341 | B1 | | 10/2004 |
| KR | 200367525 | Y1 | | 11/2004 |
| KR | 200369937 | Y1 | | 12/2004 |
| KR | 200394275 | Y1 | | 9/2005 |
| KR | 200395554 | Y1 | | 9/2005 |
| KR | 20060010717 | A | | 2/2006 |
| KR | 200439673 | Y1 | | 4/2008 |
| KR | 20090010717 | A | | 1/2009 |
| KR | 20090010717 | U | | 10/2009 |
| KR | 20100112249 | A | | 10/2010 |
| KR | 20110113819 | A | | 10/2011 |
| KR | 101234507 | B1 | | 2/2013 |
| KR | 20130082427 | A | | 7/2013 |
| KR | 101336422 | B1 | | 12/2013 |
| KR | 101392845 | B1 | | 5/2014 |
| KR | 101396272 | B1 | | 5/2014 |
| KR | 101509029 | B1 | | 4/2015 |
| KR | 20150033455 | A | | 4/2015 |
| KR | 101566166 | B1 | | 11/2015 |
| KR | 20150140672 | A | | 12/2015 |
| KR | 20160090493 | A | | 8/2016 |
| KR | 300906653 | | | 5/2017 |
| KR | 101829167 | B1 | | 2/2018 |
| KR | 20190035787 | A | | 4/2019 |
| PL | 230008 | B1 | | 9/2018 |
| RU | 2417719 | C1 | | 5/2011 |
| RU | 2419364 | C2 | | 5/2011 |
| RU | 2558482 | C1 | | 8/2015 |
| RU | 156273 | U1 | | 11/2015 |
| RU | 2576010 | C2 | | 2/2016 |
| TR | 201200188 | U | | 2/2012 |
| TW | M388245 | U | | 9/2010 |
| TW | M430199 | U | | 6/2012 |
| TW | M476490 | U | | 4/2014 |
| TW | 201519805 | A | | 6/2015 |
| TW | M537837 | U | | 3/2017 |
| TW | M541752 | U | | 5/2017 |
| WO | 2007138289 | A1 | | 12/2007 |
| WO | 2008140152 | A1 | | 11/2008 |
| WO | 2009082098 | A2 | | 7/2009 |
| WO | 2012026315 | A1 | | 3/2012 |
| WO | 2014029935 | A1 | | 2/2014 |
| WO | 2014139943 | A1 | | 9/2014 |
| WO | 2014163364 | A1 | | 10/2014 |
| WO | 2015116246 | A1 | | 8/2015 |
| WO | 2015190845 | A1 | | 12/2015 |
| WO | 2017086254 | A1 | | 5/2017 |
| WO | 2018002914 | A1 | | 1/2018 |
| WO | 2018022914 | A1 | | 2/2018 |
| WO | 2018119034 | A1 | | 6/2018 |
| WO | 2020082056 | A1 | | 4/2020 |
| WO | 2020082058 | A1 | | 4/2020 |

OTHER PUBLICATIONS

Youtube: "Goodyard Eyelash Production Process," Goodyardhair Factory, 2016, 57 Pages, Retrieved from URL: https://www.youtube.com/watch?v=FIxGtTPNALo.

Youtube: "How False Eyelashes Are Made," Nov. 29, 2015, 69 Pages, Retrieved from URL: https://www.youtube.com/watch/=hqsxokthwqg.

Youtube: "How to : Master Applying False Eyelashes," Jan. 23, 2014, 137 pages, [Downloaded on Mar. 28, 2024] Retrieved from [URL: https://www.youtube.com/watch?v=rtX7pZgiJe8].

Youtube: "How to Apply Cluster Party Lashes 2," Feb. 12, 2014, 43 Pages, Retrieved from URL: https://www.youtube.com/watch?v=faKvACCAvNU.

Youtube: "How to apply Cluster/Party Lashes 2," Feb. 12, 2014, 79 pages, [Downloaded on Mar. 28, 2024] Retrieved from [URL: https://www.youtube.com/watch?v=faKvACCAvNU].

Youtube: "How to Apply False Eyelashes for Beginners Two Easy Ways," Sep. 6, 2013, 29 Pages, Retrieved from URL: https://www.youtube.com/watch?app=desktopv=790S17fNzOE.

Youtube: "How to Apply False Lashes . . . Underneath!? ," Jan. 13, 2017, 66 Pages, Retrieved from URL: https://www.youtube.com/watch?v=mlkvFgb8PmA.

Youtube: "How to Apply False Lashes Under Your Lashes Reverse Eyelash Trick Makeup Hack," 2016, 40 Pages, Retrieved from URL: https://www.youtube.com/watch?v=BCq4xCQrQHE.

(56) References Cited

OTHER PUBLICATIONS

Youtube: "How to Apply iENVY Quattro Collection Eyelashes," Aug. 18, 2015, 14 Pages, Retrieved from URL: https://www.youtube.com/watch?v=kW-ovlGoCmc.
Youtube: "How to Apply Individual False Lashes—Lashes Love Leather," 2016, 24 Pages, Retrieved from URL: https://www.youtube.com/watch?v=nLMz-lauMkl.
Youtube: "How to Apply Individual Lashes," Apr. 5, 2010, 77 Pages, Retrieved from URL: https://www.youtube.com/watch?v=9X84CUIWqgo.
Youtube: "How to Apply Individual Lashes," Mar. 16, 2013, 77 Pages, Retrieved from URL: https://www.youtube.com/watch?v=aLHE2SqzlO8.
Youtube: "How to Apply Individual Lashes ft. Ardell Individuals | Melissa Alatorre," 2015, 46 Pages, Retrieved from URL: https://www.youtube.com/watchv=c2iqLwjryWM.
Youtube: "How to Apply Lashes Using Sephora Bull Eye Lash Applicator," Nov. 14, 2012, 32 Pages, Retrieved from URL: https://www.youtube.com/watch?v=yYwcYzXJX4M.
Youtube: "How to Fake Eyelash Extensions Reviewing Kiss Ever EZ Lashes," 2015, 40 Pages, Retrieved from URL: https://www.youtube.com/watch?v=AhJyTcClaMs.
Youtube: "How to Master Individual Fake Eyelashes NewBeauty Tips Tutorials," Aug. 21, 2015, 56 Pages, Retrieved from URL: https://www.youtube.com/watch?v=ObltZN1NsB0&t=44s.
Youtube: "In Depth Tutorial Ardell Lashtite Glue Apply Under My Natural Lashes," Feb. 24, 2015, 40 Pages, Retrieved from URL: https://www.youtube.com/watch?v=comq0clt560.
Youtube: "Introducing Kiss EverEZ Trio Lashes," May 10, 2013, 47 Pages, Retrieved from URL: https://www.youtube.com/watch?v=37z4VMQ7Yxc.
Youtube: "Introducing: ProComfort Ceramic Angled Tweezer," Aug. 29, 2014, 13 pages, [Downloaded on Mar. 28, 2024] Retrieved from [URL: https://www.youtube.com/watch?v=oAHGR_Y8mvk].
Youtube: "Lisa Eldridge—How to Apply Individual False Eyelashes Tutorial," Youtube, Mar. 17, 2010, 45 Pages, Retrieved from URL: https://www.youtube.com/watch?v=IKO10VdtLFU.
Youtube: "Solving the Oval Office Puzzle Box," Puzzle Master Incorporated, Published by PuzzleOZ, Jun. 4, 2017, 7 Pages, Site Vistied May 17, 2019, Retrieved from URL: https://www.youtube.com/watchv=wzZCm9sUU7E.
Youtube: "Process of Making False Eyelash Product," Lux Beauty Lashes, Dec. 12, 2015, 53 Pages, Retrieved from URL: https://www.youtube.com/ watchv=515QCxnjrkQ.
Youtube: "Process of Making Mellow Eyelashes," Nov. 12, 2015, 60 pages, [Downloaded on Mar. 28, 2024] Retrieved from [URL: https://www.youtube.com/watch?v =-VIhGQX58HM].
Youtube: "Reverse Eyelash Hack: Does it work?," Oct. 12, 2016, 75 Pages, Retrieved from URL: https://www.youtube.com/watch?v=sx_X89xdBbE.
Youtube: "Reverse Eyelash Trick Makeup Hack," Sep. 18, 2016, 55 Pages, Retrieved from URL: https://www.youtube.com/watch?/=FQFF1sOQbCI.
Youtube: "Reverse Eyelash Tutorial-Irisbeilin," Sep. 13, 2016, 20 Pages, Retrieved from URL: https://www.youtube.com/watch/=q1Cu0p6bqHs.
Youtube: "Review New Kiss | Envy EZ Lashes Trio Lashes—Easier Than Individual Lashes," Mar. 10, 2021, 47 Pages, Retrieved from URL: https:// www.youtube.com/watch?v=BS9G6jgDgOA.
Youtube: "The Best Way to Apply False Lashes," Cosmopolitan, Apr. 1, 2016, 4 Pages, Retrieved from URL: https://www.youtube.com/watch?/=40yZu-4KZs8.
Youtube: "Trio Lashes Are So in Right Now | Ever EZ Lashes by Kiss," Feb. 20, 2015, 43 Pages, Retrieved from URL: https://www.youtube.com/watch?v=bx6PXgZMvhg.
Youtube: "Volume Tweezers," Jun. 11, 2014, 20 Pages, Retrieved from URL: https://www.youtube.com/watchv=vvbDF18x2h8.
Patent Trial and Appeal Board (PTAB), PGR2021-00046, *Kiss Nail Product Incorporated* v. *Lashify Incorporated* (Patent Owner).
Peonies and Lilies: "Bourjois 2 in 1 Tweezers and Faux Fabulous Eyelashes," Beauty, Lifestyle, Travel, Oct. 24, 2012, 2 Pages.
Picclick: "I-Envy by Kiss So WISPY #01 Strip Eyelashes KPE58 False Lashes Black 1 Pair New," Dec. 30, 2020, 8 Pages, Retrieved from URL: https://www.picclickimg.com/d/w1600/pict/292311410878_/i-ENVY-by-Kiss-SO-WISPY-01-Strip-Eyelashes.jpg.
Pinterest: "How to Apply iENVY Quattro Collection Eyelashes," Dec. 30, 2020, 14 Pages, [Retrieved on Mar. 31, 2023] Retrieved from URL: https://www.pinterest.com/pin/433472151413160080/.
Pinterest: "Kiss Bring the Salon Home," 2 Pages, [Retrieved on Dec. 30, 2020] Retrieved from URL: https://www.pinterest.com.au/pin/19562579608263895/.
Pinterest: "Kiss I-Envy 100% Human Eyelash So Wispy 03," 3 Pages, [Retrieved on Dec. 30, 2020] Retrieved from URL: ; https://www.pinterest.co.kr/pin/308285536984155041/.
Pinterest: "Kiss I-Envy by Kiss 100% Human Pre Cut Eyelash Quattro 02 Lashes," 2 Pages, [Retrieved on Dec. 30, 2020] Retrieved from URL: https://www.pinterest.cl/pin/576038608568497288/amp_client_id=CLIENT_ID(_J&mweb_unauth_id=from_amp_pin_page=true.
Pinterest: "Kiss Premium Lashes, I-Envy by Kiss Premium Lashes," 2 Pages, [Retrieved on Dec. 30, 2020] Retrieved from URL: https://www.pinterest.es/amp/pin/449515606533816815/.
Qingdao Hongfutian Eyelash Co., Ltd., Youtube, Oct. 13, 2016, 21 Pages, Retrieved from URL: https://www.youtube.com/watch?v=rlnKgJJm7-0".
Rich., "Buzludzha Monument, Gueorguy Stoilov Circa," Justanotherbackpacker.com, Apr. 29, 2014, 10 Pages, Site Visited on Aug. 27, 2019, Retrieved from URL: http://www.justanotherbackpacker.com/buzludzha-monument-bulgaria-ufo/.
Rodulfo K., "This DIY Lash Extension Kit Has Ruined Mascara for Me Forever," ELLE, May 16, 2018, 6 Pages, [Retrieved on Dec. 31, 2018] Retrieved from URL: https://www.elle.com/beauty/makeup-skin-care/a20704236/lashify-lashes-kit-review/.
Rosato M.G., et al., "Basics and Overviews of Plastics Fabricating Processes," Springer Science Business Media, New York, 2000, pp. 39-52.
Satkowski M.M., "The Crystallization and Morphology of Polyethylene and its Blends," Doctoral Dissertations 1896—Feb. 2014, Jan. 1, 1990, 4 Pages.
Search Report and Written Opinion for Singapore Application No. 10202106633V, dated Jan. 21, 2022, 13 Pages.
Shopee: "Tweezer Applicator for False Fake Eyelash Eye Lash Lashes Falsies Cosmetic Tool," Jul. 14, 2019, 1 Page, [Retrieved on Oct. 14, 2022] Retrieved from URL: https://shopee.ph/Tweezer-Applicator-For-False-Fake-Eyelash-Eye-Lash-Lashes-Falsies-Cosmetic-Tool-i.63392971.1750684108.
Shopee: "Vetus Tweezers, Anti Static Non-Magnetic, High Precision Stainless Steel Tweezer Tool," Aug. 10, 2021, 1 Page, [Retrieved on Oct. 14, 2022] Retrieved from URL: https://shopee.com.my/VETUS-Tweezers-Anti-Static-Non-Magnetic-High-Precision-Stainless-Steel-Tweezer-Tool-i.183308257.783935374.
Siegmann A., et al., "Melting and Crystallization of Poly (Ethylene Terephthalate) under Pressure," Journal of Polymer Science: Polymer Physics Edition, 1980, vol. 18 (11), pp. 2181-2196.
Silmy's Eyelashes, Youtube, 2011, 11 Pages, Retrieved from URL: https://www.youtube.com/watch?v=I_rg1ybHUwY.
Staar Alert: "Locking Automated Medication Dispenser," Starralert.com, WayBack Machine, Staar Altelt, Aug. 14, 2020, 4 Pages, [Retrieved online on Feb. 19, 2021] Retrieved from URL: https://www.staaralert.com/locking-medication-dispenser.
"The Small Things, How to Fake a Thicker Lash Line," May 17, 2017, Retrieved from URL: https://www.thesmallthingsblog.com/2016/05/how-to-Fake-a-thicker-lash-lme/#:text=Pick%20up%20a%20gel%20orof%20a%20thicker%20lash%20lme.
The Sunday Girl: "Bourjois-2-in-1 Tweezers and False Eyelash Applicator Review," Nov. 5, 2012, 1 Page, [Retrieved on Apr. 13, 2021] Retrieved from URL: http://www.thesundaygirl.com/2012/11/bourjois-2-in-1-tweezers-and-false.html.
Troughton M.J., et al., "Handbook of Plastics Joining: A Practical Guide," 2nd Edition, William Andrew Incorporated, Oct. 17, 2008, 25 Pages.

(56) References Cited

OTHER PUBLICATIONS

Tweezers: "Eyelash Tweezers—FEITA Precision Eyelash Extension Tweezers Set—Professional Straight Curved Pointed Very Fine Tip Tweezers for Lash Extensions—Black-2Pcs," Reviewed on Dec. 13, 2016 on Amazon.com, 30 Pages, [Retrieved on Dec. 31, 2018] Retrieved from URL: https://www.amazon.com/Eyelash-Tweezers-Precision-Extension-Professional/dp/B01I2KSUDSth=1.

Ubuy: "I-Envy by Kiss Premium Quattro 02 Lashes," Dec. 30, 2020, 3 Pages, Retrieved from URL: https://www.ubuy.com.kw/en-sa/catalog/product/view/id/37236.

United Beauty Supply: "Kiss I-Envy Trio Lashes Ultra Volume KPEC-3X Volume," 7 Pages, [Retrieved on Mar. 9, 2021] Retrieved from URL: https://www.unitedbeautysupply.com/product/kiss-i-envy-trio-lashes-ultra- /olume-kpec/.

United States District Court District of California San Francisco Division, 3:20-cv-06086, *Lashify Incorporated* v. *Alicia Zeng and Patrick Ellsworth* d/b/a Lilac St; and *Artemis Family Beginnings Incorporated*.

United States District Court District of New Jersey, 2:20-cv-10023-JMV-MF, *Lashify Incorporated* v. *Kiss Nail Products Incorporated*.

U.S.Salonsupply: "Kiss I-Envy Premium Quattro 01 Lashes," 2 Pages, [Retrieved on Dec. 30, 2020] Retrieved from URL: https://www.ussalonsupply.com/Kiss-I-Envy-Quattro-01-Lashes-p_120305.html.

Varga J., et al., "Vibration Welding of Alpha and Beta Isotactic Polypropylenes: Mechanical Properties and structure," Express Polymer Letters, Mar. 1, 2008, vol. 2, No. 3, pp. 5-19.

Versionone S., "Cruiser Portable Speaker," NYNE, Published at thegamerwithkids. com, Posted on Apr. 6, 2015, not listed, [Cite Visited Jun. 20, 2018],3 Pages, Retrieved from URL: https://thegamerwithkids.com/2015/04/06/nyne-cruiser-review-a-wireless-speaker-for-your-bycicle/.

Walmart: "Kiss I-Envy by Kiss Premium Quattro 02 Lashes," 8 Pages, [Retrieved on Dec. 30, 2020] Retrieved from URL: https://www.walmart.com/ip/Kiss-I-Envy-Quattro-02-Lashes/187353459.

Web: "Best Tweezers—Ergonomic Products," The Wayback Machine, Feb. 14, 2014, 02 pages, [Downloaded on Mar. 28, 2024] Retrieved from [URL: https://web.archive.org/web/20120214160346/ http://www.beauty2makeup.com:80/blog/best-tweezers/].

Web: "Diamond Elite Tweezer—Main," Embellashes, Feb. 20, 2024, 03 pages, [Downloaded on Mar. 28, 2024] Retrieved from [URL: https://embellashes.com/product/diamond-elite-tweezer-2/].

Web: "Eyelash Extensions Tweezer," Shine Beauty Group, Feb. 20, 2024, 06 pages, [Downloaded on Mar. 28, 2024] Retrieved from [URL: https://www.shinebeautygroup.com/eyelash-extension-products/p/diamond-elite-tweezers-1].

Web: "ProComfort Ceramic Angled Lash Extensions Tweezer," Xtreme Lashes, Feb. 20, 2024, 03 pages, [Downloaded on Mar. 28, 2024] Retrieved from [URL: https://www.xtremelashes.com/tweezers-and-tools/procomfort-ceramic-angled-tweezer?selection=&gad_source=1gclid=EAlalQobChMI34KCotq4hA . . .].

"Why Tightlining is the Makeup Trick you Need to Try," Get The Gloss, May 6, 2016, 6 Pages, Retrieved from URL: https://www.getthegloss.com/beauty/makeup/why-tightlining-is-the-makeup-trick-you-need-to-try.

Youtube: "All About Eyelash Extensions! FAQ's Application FAQ'S SaturdayNightsAlrite," 2013, 175 Pages, Retrieved from URL: https://www.youtube.com/watch?v=MTL70W58l9l.

Youtube: "Applying False Lashes Underneath Your Own Top Eye Lashes Best Beauty Tip/Hack Ever," Jul. 2, 2016, 46 Pages, Retrieved from URL: https://www.youtube.com/watch2v-FzEtZgY-5Y8.

Youtube: "Applying Falsies Under Lash?! Does It Work?," Sep. 14, 2016, 57 Pages, Retrieved from URL: https://www.youtube.com/watch?v=V96EKKAe03c.

Youtube: "Applying Falsies Under Lash Does It Work!!," Sep. 27, 2016, 57 Pages, Retrieved from URL: https://www.youtube.com/watch?v=5kytWJOQbg.

Youtube: "Applying Falsies Underneath Lash," Sep. 24, 2016, 47 Pages, Retrieved from URL: https://www.youtube.com/watch?v=6VopJnVWv8s&t=13s.

Youtube: "Applying Falsies Underneath Reverse Best Lash Hack," Sep. 22, 2016, 20 Pages, Retrieved from URL: https://www.youtube.com/watch?v=GhG5hoMh000.

Youtube: "Artificial Eyelashes (1949)," Apr. 13, 2014, 87 Pages, Retrieved from URL: https://www.youtube.com/ watch?v=8Fv7EzDvo58.

Youtube: "Bella Lash Diamond Elite Tweezers," Jul. 11, 2016, 36 pages, [Downloaded on Mar. 28, 2024] Retrieved from [URL: https://www.youtube.com/watch?v=yWB4YR6CkYc].

Youtube: "Crazy False Eyelash Hack For Natural Comfortable Lashes," 2017, 31 Pages, Retrieved from URL: https://www.youtube.com/watch?v=99rHNYe3GFw.

Youtube: "Deyeko—Olga Lydia Factory Visit," Jun. 24, 2013, 47 Pages, Retrieved from URL: https://www.youtube.com/watch?v=Q5ZLklqkEtY.

Youtube: "Dream Lashes Curved Volume Tweezer—3 Minute Test," Sep. 30, 2016, 1.15-1.30, 1 Page [Downloaded on Feb. 13, 2019] Retrieved from URL: https://www.youtube.com/watch?v:vwqYeEOSD7s.

Youtube: "Eyelash Extensions: Self Eyelashes," 2 pages, [Retrieved on Sep. 17, 2014], Retrieved from [https://www.youtube.com/watch?v=gfoGzBwvcnE].

Youtube: "False Lashes Tips and Tricks for Beginners, The How to Guide for Lashes," Jan. 27, 2017, 36 Pages, Retrieved from URL: https://www.youtubecom/watchv=BaQO8g4iUxY.

Youtube: "Falsecara by: Kiss," Jan. 2, 2021, 1 Page, [Retrieved on Nov. 14, 2023] Retrieved from [URL:https://www.kissusa.com/products/falscara-starter-kit-diy-lash-extensions].

Hongiun Web Page: Oct. 31, 2018, 16 Pages, Retrieved from URL:https://detail.1686.com/offer/574685154963.html?spm=a2615.7691456.iewlist.75.22f96dc5Msy00t.

Ienvy: "Kiss-Ienvy Collection," 02 Pages, [Retrieved on Dec. 30, 2020] Retrieved from URL: ienvybykiss.com.

Imagessentials: "How to Wear False Eyelashes Without Looking Like You're Wearing Them," 2012, 5 Pages, Retrieved from URL: https://imagessentials.wordpress.com/2012/03/30/how-to-wear-false-eyelashes-without-looking-like-youre-wearing-any/.

Influenster: "Kiss I-Envy Eye Lash Adhesive (6g Individual, Clear) Reviews," 4 Pages, [Retrieved on Dec. 30, 2020] Retrieved from URL: https://www.influenster.com/reviews/kiss-i-envy-eye-lash-adhesive-6g-individual-clear.

Instagram: "Lashify Wand," 1 Page, [Retrieved on 2019] Retrieved from URL: https://www.instagram.com/p/BWgeQ8wg00SR/iqshid=zauiyw8a6v5.

International Search Report and Written Opinion for International Application No. PCT/US2017/044217, mailed Nov. 27, 2017, 15 Pages.

International Search Report and Written Opinion for International Application No. PCT/US2017/067513, mailed Mar. 12, 2018, 10 Pages.

International Search Report and Written Opinion for International Application No. PCT/US2019/057102, mailed Dec. 23, 2019, 12 Pages.

International Search Report and Written Opinion for International Application No. PCT/US2019/057104, mailed Dec. 19, 2019, 8 Pages.

International Search Report and Written Opinion for International Application No. PCT/US2020/013554, mailed May 7, 2020, 8 Pages.

International Search Report and Written Opinion for International Application No. PCT/US2020/013561, mailed May 7, 2020, 10 Pages.

International Search Report and Written Opinion for International Application No. PCT/US2020/054014, mailed Jan. 20, 2021, 11 Pages.

International Search Report and Written Opinion for International Application No. PCT/US2022/039083, mailed Oct. 31, 2022, 16 Pages.

(56) References Cited

OTHER PUBLICATIONS

International Search Report and Written Opinion for International Application No. PCT/US2022/045558, mailed Dec. 20, 2022, 15 Pages.
Japonesque False Eyelash Applicator, 1 Page.
Japonesque: "False Lash Applicator," Feb. 13, 2019, 6 Pages, Retrieved from URL: https://japonesque.com/ products/implements/false-lash-applicator/.
Kiss Nail Products Inc: Third Supplemental Objections and Responses to Lashify, Inc.'s First Set of Interrogatories (Nos. 1-56) Investigation No. 337-TA-1226, "In the Matter of Certain Artificial Eyelash Extension Systems, Products, and Components Thereof," Mar. 10, 2021, 430 Pages.
Kissusa: "A True Lash Extension Look in Minutes Falscara the New Way to Lash," Feb. 5, 2021, 6 Pages, Retrieved from URL: https://www.kissusa.com/falscara-false-ayelash-extension-look.
Kissusa: "DIY Lash Extensions by: Kiss," May 20, 2021, 1 Page, [Retrieved on Apr. 7, 2023] Retrieved from URL: https://www.kissusa.com/kiss-falscara-eyelash-starter-kit-01.
Kissusa: "Falscara Starter Kit," Dec. 15, 2021, 1 Page, [Retrieved on Apr. 7, 2023] Retrieved from URL: https://www.kissusa.com/lashes/kiss-falscara-eyelash-starter-kit-01.
Kissusa: "Falsecara Eyelash by: Kiss," Sep. 20, 2020, 5 Pages, [Retrieved on Apr. 17, 2021] Retrieved from URL: https://web.archive.org/web/20201126033616/https://www.kissusa.com/lashes/kiss-falscara-eyelash-starter-kit-01.
Kissusa: "Kiss Falscara Eyelash-Bond Seal," 3 Pages, Retrieved from URL: https://www.kissusa.com/kiss falscara-eyelash-bond-seal.
Lades: "Eyelashes Clip—2 Pieces False Eyelashes Applicator Tool Eyelash Extension Tweezers Remover Clip Nipper," Amazon, Aug. 2, 2017, 22 Pages, XP055720051, Retrieved from URL: https://www.amazon.co.uk/Eyelashes-Clip-Applicator-Extension-Tweezers/dp/B07PK6VBVW.
Lash Applicator by: Pro Lashbeauty (Dec. 14, 2023) https://www.amazon.com/dp/B0CB3ZZRTJ/ref=sspa_dk_detail_0psc=1&pd_rd_i=B0CB3ZZRTJ&pd_rd_w=v4LsU&content-id=amzn1.sym.68f30e61-3dba-4ebe-8f1b-a0b000b95ff8&pf_rd_p=(May 3, 2023).
Lashaddict: "Kiss I-Envy by Kiss Premium Quattro 02 Lashes," 4 Pages, [Retrieved on Dec. 30, 2020] Retrieved from URL: https://www.lashaddict.nl/kiss-i-envy-lashes-quattro-02.html.
Lashify: "Fuse Control Wand V2, Lashify," Reviewed on Oct. 23, 2018 on Lashify.com, 1 Page, [Retrieved on Dec. 31, 2018] Retrieved from URL: https://lashify.com/collections/lashify-tools/products/fuse-control-wand-v2variant=13400696586351#shopify-product-reviewsretrieved.
Lashify: "Lashify Gossamer Lash Cartridge," Jun. 15, 2018, 2 Pages, Retrieved from URL: https://lashify.com/collections/shop-1/products/gossamer-eye-lozenge-c-style/variant=783670738950.
Lashify: "Violet Gossamer," Sep. 30, 2020, 7 Pages, Site Visited Feb. 17, 2021, Retrieved from URL: https://lashify.com/products/gossamer-lash-cartridge-prismatic-colors-violetvariant=20045369835631.
Lindstrom I., et al., "Occupational Asthma and Rhinitis Caused by Cyanoacrylate-based Eyelash Extension Glues," Occupational Medicine, Apr. 3, 2013, vol. 63, No. 4, pp. 294-297.
Loveyelashes: "Kiss I-Envy Premium Quattro 01 Lashes," 2 Pages, [Retrieved on Dec. 30, 2020] Retrieved from URL: https://www.loveyelashes.com/bfont-colorgreenstrip-lashesfontb-299-envy-by-kiss-quattro-01-(1555,129,1,48)p.html#.
Mac Cosmetics: "34 Lash," Feb. 14, 2019, 1 p. Retrieved from URL: http://www.bornprettystore.com/false-eyelashes-thick-natural-simulation-recyclable-curly-false-eyelash-makeup-cosmetic-tools-p.44675.html.
Mac: "Mac Lash Applicator," 2014, 4 Pages, Retrieved From URL: https://www.maccosmetics.com/product/13811/32724/products/brushes-tools/tools/sponges-applicators/lash-applicator? gclid=EAlalQobChMlsqzhnlz79AIVHAalCROqngPWEAQYAyABEgKxP_D_BwE&gclsrc=aw.ds.
Madame Madeline: "Ardell Dual Lash Applicator (62059)," 3 Pages, [Retrieved on Oct. 18, 2018] Retrieved from URL: https://www.madamemadeline.com/online_shoppe/proddetail.asp?prod=mm62059.
Madame Madeline: "Kiss I-Envy Premium Quattro 01 Lashes (KPE62)," 2 Pages, [Retrieved on Dec. 30, 2020] Retrieved from URL: https://www.madamemadeline.com/online_shoppe/proddetail.asp?prod=mmKPE62.
Made in China: "New Product Eyelashes Aid Eyelashes Applicator Innovative Eyelashes Curler," 2018, 2 Pages, [Retrieved on Feb. 13, 2019], Retrieved from URL: https://www.made-in-china.com/productdirectory.do?word=creative+eyelashe-curler&subaction=hunt&style=b&mode=and&code=0&comProvince=nolimit&order=0&isOpenCoiTection=1.
Matweb: "Overview of Materials for Polybutylene Terephthalate (PBT), Unreinforced, Molded," [Retrieved on Mar. 29, 2023] 5 Pages, Retrieved from [URL: https://www.matweb.com/search/datasheet_print.aspx? matguid=781bd0e9d0854fd5a919866c39ea3065].
Modernbeauty: "Kiss I-Envy Individual Eye Lash Adhesive," 3 Pages, [Retrieved on Dec. 30, 2020] Retrieved from URL: https://www.modernbeauty.com/cosmetics/lashes/false-lashes/ Product/26961-i-envy-individual-eyelash-adhesive-retail.html.
Notter E., "The Art of the Chocolatier from Classic Confections to Sensational Showpieces," John Wiley Sons, Jan. 18, 2011, 4 Pages.
Office Action for Australian Patent Application No. AU20190360273, mailed Nov. 13, 2023, 3 Pages.
Office Action for Australian Patent Application No. AU20220235619, mailed Nov. 14, 2023, 2 Pages.
Office Action for Canadian Patent Application No. CA3123630 mailed on Jan. 19, 2024, 7 Pages.
Office Action for Chinese Patent Application No. 202110550925.3, mailed Oct. 31, 2023, 24 Pages.
Office Action for European Patent Application No. 17884561.6, mailed Mar. 5, 2024, 06 Pages.
Office Action for European Patent Application No. 20190873364, mailed Sep. 19, 2023, 7 Pages.
Office Action for Indonesian Patent Application IDP00202205125 mailed Jan. 24, 2024, 3 pages.
Office action for Japanese Application No. 2019504850, dated Aug. 30, 2021, 8 Pages.
Office Action for Japanese Patent Application No. JP2023-014624, mailed Dec. 18, 2023, 7 Pages.
Pak Lajpall: "Nail Artist Tweezers PL-1," 1 Page, [Retrieved on Feb. 13, 2019], Retrieved from URL: http://www.laipall.com/proddetail.prod=nail-artists-tweezers1.
Palin G.R., "Plastics for Engineers: An Introductory Course," Chapter 13, Thermosetting Plastics, Elsevier, 1967, pp. 125-139.
Patent Trial and Appeal Board (PTAB), PGR2021-00045, *Kiss Nail Products Incorporated* (Petitioner) v. *Lashify Incorporated* (Patent Owner).
Allure: "Lashify False Lashes Review," Published by Sable Yong, Oct. 10, 2018, 9 Pages, Site Visited Feb. 17, 2021, Retrieved from URL: https://www.allure.com/story/lashify-false-eyelashes-review-photos.
Amazon: "6 Pieces Eyelash Packaging Cirle Box with Mirror, Eyelash Storage Box Empty Lash Case with Lash Holder for Women Girls (Rose Gold)," Maitys, Amazon.com, Jun. 23, 2020, 1996-2021, pp. 1-8, Site visited Oct. 25, 2021, Retrieved from URL: https://www.amazon.co.uk/piece-Eyelash-Packaging-Circle-Storage/dp/B08BNZ5GQQth=1.
Amazon: "Alessi Yoyo Pill Box, Published by Michel Bouquillon," Nov. 20, 2018, 9 Pages, Site Visted Aug. 6, 2020, Retrieved from URL: https://www.amazon.com/Alessi-Stainless-Steel-Michel-Bouquillon/dp/B07KKFQNQ6.
Amazon: "Eyelash Applicator Tool by: Lasnten," Mar. 2, 2022, 1 Page, [Retrieved on Nov. 14, 2023] Retrieved from [https://www.amazon.com/Lasnten-Applicator-Tweezers-Extensions-Stainless/dp/B0CG9DDLTN?th=1].
Amazon: "Kiss I-Envy Premium Quattro 01 Lashes," 3 Pages, [Retrieved on Dec. 30, 2020] Retrieved from URL: https://www.amazon.ca/Kiss-ienvy-quattro-Makeup-Count/dp/B016SKJJKM.

(56) References Cited

OTHER PUBLICATIONS

Amazon: "Kiss I-Envy Quattro 02 Lashes, Pack of 3," 5 Pages, [Retrieved on Dec. 30, 2020] Retrieved from URL: https://www.amazon.com/iEnvy-Kiss-Quattro-Lashes-Pack/dp/B01706J2FG.
Amazon: "Kiss I-Envy Quattro Lashes 01, Pack of 3," 5 Pages, [Retrieved on Dec. 30, 2020] Retrieved from URL: https://www.amazon.com/iEnvy-Kiss-Quattro-Lashes-Pack/dp/B06XGBTCHW.
Amazon: "Kiss I-Envy Trio Medium Lashes 30 Trio Lashes (2 Pack)," 7 Pages, [Retrieved on Mar. 9, 2021] Retrieved from URL: https://www.amazon.com/Kiss-Envy-Trio-Medium-Lashes/dp/B018JORMXU.
Amazon: "Kiss I-Envy Ultra Black Trio Medium Lashes KPEC02UB (2 Pack)," 7 Pages, [Retrieved on Mar. 9, 2021] Retrieved from URL: https://www.amazon.com/Kiss-Envy-Ultra-Black-Medium/dp/B00W2C4HPS?th=1.
Amazon: "Lashview Vetus Angled Pointed Perfect Craft Fine Angled Removal Stainless Steel Tip Curved Tweezers for Professional Grafting Eyelash Extension False Eyelash Nail Art Electionics Medical," By Lashview Vetus, Found on Amazon on Apr. 15, 2021, 1 Page, Retrieved from URL: https://www.amazon.com/dp/B01M4KQOCH/ref=sspa_dk_detail_Opsc=1&pd_rd_i= Mar. 22, 2018.
Amazon: "Leteveri Eyelash Applicator Tool- 35mm Width False Eyelash Tool with Silicone Clip Design, 2PCS Eyelash Tweezers for False Lashes," Oct. 12, 2022, 1 Page, [Retrieved on Mar. 10, 2023] Retrieved from URL: https://www.amazon.com/Leteveri-Eyelash-Applicator-Tool-Silicone/dp/B0BM5QYC1F/ref=sr_1_3?crid=3SMPJ51ZRAT4N&keywords=.
Amazon: "Ocamo False Eyelashes Curler Stainless Steel Extension Eye Lash Applicator Remover Tweezers Clip Makeup Tools," 3 Pages, [Retrieved on Oct. 10, 2018] Retrieved from URL: https://www.amazon.kin/Ocamo-Eyelashes-Stanless-Extension-Applicator/dp/B07FT5XW8C?ag=googinhydr18418-21&tag=googinkenshoo-21&ascsu.
amazon.com: "Kiss Ever Ez Lahes 30 Count Trio Lashes in Various Lengths 57927: Beauty," 8 Pages, [Retrieved on Mar. 9, 2021] Retrieved from URL: https://www.amazon.com/kiss-Lahes-Lashes-Various-Lengths/dp/B00JH7SR4S.
Ammancart: "Kiss I-Envy Premium Quattro 01 Lashes," 2 Pages, [Retrieved on Dec. 30, 2020] Retrieved from URL: https://www.ammancart.com/products/kiss-i-envy-premium-quattro-01-ashes-kpe62.
Beautylicious: "Kiss I-Envy Pre-Cut Lashes," 4 Pages, [Retrieved on 2020-12-30] Retrieved from URL: https://www.shopbeautylicious.com/products/kiss-i-envy-pre-cut-lashes.
Beautyproducstusa: "Kiss I-Envy Premium Quattro 01 Lashes," 2 Pages, [Retrieved on Dec. 30, 2020] Retrieved from URL: https://www.beautyproductsusa.com/home/322-kiss-i-envy-strip-eyelash- quattro-01-kpe62.html.
Bicoastal Beauti: "Kiss i-ENVY Premium Quattro 01 Lashes (KPE62), " 3 Pages, [Retrieved on Dec. 30, 2020] Retrieved from URL: https://www.bicoastalbeauti.com/shop/kiss-brand-lashes/kiss-i-envy-premium-quattro/.
Bilobeauty: "Kiss I-Envy Premium Quattro 01 Lashes," 2 Pages, [Retrieved on Dec. 30, 2020] Retrieved from URL: https://www.biloltd.net/product-p/60351.html.
BL Lashes: "Your Guide to Russian Volume Lash Extensions," 10 Pages, [Retrieved on Mar. 29, 2023] Retrieved from URL: https://www.bllashes.com/blogs/blog/your-guide-to-the-must-have-tools-for-russian-volume-lashes.
Born Pretty: "False Eyelashes Thick Natural Simulation Recyclable Curly False Eyelash Makeup Cosmetic Tools," 6 p. [Retrieved on Oct. 18, 2018] Retrieved from URL: http://www.bornprettystore.com/false-eyelashes-thick- natural-simulation-recyclable-curly-false-eyelash-makeup-cosmetic-tools-p-44675.
Brandrup J., et al., "Polymer Data Handbook," 1999, New York: Wiley, Edited by James E. Mark, vol. 89, 7 Pages.
Buykorea: "Plastic, False Eyelash Applicator, Multy colour," Tweed K Inc., pp. 1-3, [Retrieved on Feb. 14, 2019] Retrieved from URL: http://www.buykorea.or.kr/product-details/Plastic-False-Eyelash-Applicator-Multy-colour-3106709. html.
Cardellino C., "You've Been Applying False Eyelashes Wrong Your Whole Life," Cosmopolitan, Mar. 25, 2016, 12 Pages, [Retrieved on Aug. 23, 2019] Retrieved from URL: https://www.cosmopolitan.com/style-)eauty/beauty/how-to/a55781/this-false-eyelash-hack-will-change-your-life/.
Cashmere Cosmetics: "Kiss I-Envy Premium Quattro 01 Lashes," 4 Pages, [Retrieved on Dec. 30, 2020] Retrieved from URL: https://www.cashmerecosmetics.com/product/kiss-i-envy-quattro-01-lashes/.
Delicate Hummingbird: "Ha! I've Mastered the False Lashes!," Nov. 10, 2011, 12 Pages, Retrieved from URL: http://delicatehummingbird.blogspot.com/2011/11/ha-ive-mastered-false-lashes.html.
Ebay: "BL Kiss | Envy Quattro 01 Lashes—Two Pack," 4 Pages, [Retrieved on Dec. 30, 2020] Retrieved from URL: https://www.ebay.ca/itm/BL-Kiss-I-Envy-Quattro-01-Lashes-Two-PACK-/293706028541.
Ebay: "lenvy," 23 Pages, [Retrieved on Dec. 30, 2020] Retrieved from URL: https://www.ebay.eom/sch/i.html_nkw=lenvy&norover=1&mkevt=1&mkrid=711-156598-701868-2&mkcid=2&keyword=ienvy&crip=435059434779.
Ebay: "Kiss Ever EZ Trio Lashes Medium Combo 30 EA 2pk," [Retrieved on Mar. 9, 2021] Retrieved from URL: https://www.ebay.com/urw/Kiss-Ever-EZ-Trio-Lashes-Medium-Dombo-30-EA-2pk/product-reviews/1117964400? pgn=2#.
Ebay: "Kiss I-Envy Premium Quattro 01 Lashes," 3 Pages, [Retrieved on Dec. 30, 2020] Retrieved from URL: https://www.ebay.eom/p/1044019861.
Ebay: "Kiss I-Envy Strip Eyelashes—Pack of 2 (Choose Your Style)," 2 Pages, [Retrieved on Dec. 30, 2020] Retrieved from URL: https://www.ebay.com.au/itm/Kiss-I-Envy-Strip-Eyelashes-Pack-of-2-Choose-your-Style/1 83303124469.
Ebnesajjad S., et al., "Classification of Adhesives and Compounds," Adhesives technology handbook, Nov. 26, 2014, pp. 67-83.
Electron Microscopy Sciences: "EMS High Precisions and Ultra Fine Tweezers," Feb. 13, 2019, 7 Pages, Retrieved from URL: https://www.emsdiasum.com/microscopy/products/tweezers/ultra_fine.aspx.
Extended European Search Report for European Application No. 17835287.8, mailed Feb. 11, 2020, 05 Pages.
Extended European Search Report for European Application No. 17884561.6, mailed Sep. 11, 2020, 8 Pages.
Extended European Search Report for European Application No. 19873364.4, mailed Jun. 15, 2022, 10 Pages.
Extended European Search Report for European Application No. 19874123.3, mailed Jun. 21, 2022, 8 Pages.
Extended European Search Report for European Application No. 20741513.4, mailed Oct. 21, 2022, 9 Pages.
Extended European Search Report for European Application No. 20741939.1, mailed Sep. 9, 2022, 8 Pages.
Extended European Search Report for European Application No. 21185294.2, mailed Oct. 11, 2021, 9 Pages.
Extended European Search Report for European Application No. 22211037.1, mailed Mar. 7, 2023, 6 Pages.
Eyelash applicator tool by Leteveri found on Amazon (Dec. 14, 2023), https://www.amazon.com/Leteveri-Eyelash-Applicator-Tool-Silicone/dp/B0BM5QYC1F/ref=sr_1_3crid=3SMPJ51ZRAT4N&keywords (Oct. 12, 2022).
Facebook: "Avant Garde Beauty, Eyelash Holder," Aug. 12, 2020, 2 Pages, Eyelash Holder, Site Visited Oct. 5, 2022, Retrieved from URL: https://www.facebook.com/photo/fbid=162270508866790&set=a.161502768943564.
Falscara by: "The New Line of Kiss Lashes," KISS, 2021, 1 Page, Found online on [Apr. 7, 2023] Retrieved From URL: https://www.youtube.com/watch?v=cQfRFdZa1zE&t=2s.
False Eyelashes: "False Eyelashes 101 Tip: How (and Why) to Layer False Eyelashes," May 2, 2012, 11 Pages, Retrieved from URL: https://elegantlashesblog.wordpress.com/2012/05/02/false-eyelashes-101-tip-how-and-why-to-layer-false-eyelashes/.

(56) References Cited

OTHER PUBLICATIONS

First Office Action for Chinese Application No. 201780004312.1, mailed May 7, 2020, 17 Pages.
First Office Action for Chinese Application No. 201780033755.3, mailed Aug. 28, 2020, 8 Pages.
Focallure: "Eyelash Tweezer Applicator by ILash," Shopfocallure, Feb. 14, 2019, 1 Page, Retrieved from URL: https://shopfocallure.com/collections/eyelashes/products/eyelash-tweezer-by-focallure.
Glad Girl: "Glad Lash Flare Cluster Lash Application," Jan. 31, 2014, 49 Pages, Retrieved from URL: https://www.youtube.com/watch?v=JU_ZcY95nVo&t=23s.
Hollyren: "DIY Eyelash Extensions Superfine Band Cluster Lashes Kit," 3 Pages, [Retrieved on Feb. 5, 2021] Retrieved from URL: https://www.hollyren.com/DIY-Eyelash-Extensions-Superfine-Band-Cluster-Lashes-Kit_7740.html.
Hollyren: "Oem Eyelash Applicator by: Hollyren," Apr. 7, 2023, 1 Page, Retrieved from URL: https://www.hollyren.com/ProDetail/Oem%20eyelash%20applicator.
Canadian Patent Application No. 3206108, Office Action dated Apr. 17, 2024.
Office Action for Canadian Patent Application No. 3123631, mailed Feb. 21, 2024, 06 Pages.
Office Action for Chinese Patent Application No. 202080069380.8, mailed Mar. 2, 2024, 15 Pages.
Office Action for Japanese Patent Application No. 2022121728, mailed Feb. 8, 2024, 02 Pages.
Office Action for Japanese Patent Application No. 2022520667, mailed Dec. 7, 2023, 02 Pages.
Office Action for Japanese Patent Application No. 2023112532, mailed Feb. 26, 2024, 01 Page.
Office Action for Singapore Application No. 10202106633V, mailed Feb. 27, 2024, 06 Pages.
Aibaba: "False Eye Lashes 20D Individual Lashes Grafted Eyeslashes Extension," Oct. 2, 2024, 16 Pages, Retrieved from [https://www.alibaba.com/product-detail/false-eye-lashes-20D-individual-lashes_60689734967.html].
Amazon: "Ardell Knot-Free Individual Lash Double, Black, Medium," Retrieved on Oct. 3, 2024, 9 Pages, Retrieved from [https://www.amazon.com/Ardell-Double-Individuals-Flares-Black/dp/B00CAOFL66/ ref=cm_cr_arp_d_product_top?ie=UTF8th=1].
Amazon: "Kiss | Envy Knot Free Medium 70 Lashes Ultra Black," [Retrieved on Oct. 3, 2024], 6 Pages, Retrieved from [https://www.amazon.com/Kiss-Medium-Lashes-Ultra-Black/dp/B01706IMOM?th=1].
Amazon: "Kiss Looks So Natural Lashes Shy (2 Packs)," Beauty Personal Care, 05 Pages, [Retrieved on Oct. 4, 2024], Retrieved from [https://www.amazon.com/Kiss-Looks-Natural-Lashes-Pack/dp/B01AX2Z6NK].
Ardell: "Cluster Wispies 600," The Wayback Machine, Jun. 12, 2016, 03 Pages, Retrieved from [https://web.archive.org/web/20160612220611/ http:/ardelllashes.com/Lashes/product_246.html].
Ardell: "Cluster Wispies 603," The Wayback Machine, May 19, 2016, 03 Pages, Retrieved from [https://web.archive. org/web/20160519162211/ http:/www.ardelllashes.com:80/Lashes/product_247.html].
Ardell: "Short Black," Aug. 1, 2016, 3 Pages, Retrieved from [https://web.archive.org/web/20160801162839/ http:/www.ardelllashes.com/Lashes/product_89.html].
Ardell: "Individual Lashes, "ProTip, Retrieved from [https://www.youtube.com/watch?v=6Peg8U65cK4].
Ardell: "Individual Lashes Started Kit," Jul. 6, 2016, 3 Pages, Retrieved from [https://web.archive.org/web/20160706223201/ http:/www.ardelllashes.com:80/Lashes/product_200.html].
Ardell: "Long Black," Jul. 8, 2016, 3 Pages, Retrieved from [https://web.archive.org/web/20160708102833/ http:/www.ardelllashes.com/Lashes/product_93.html].
Ardell: "Try on Lashes," The Wayback Machine, Jul. 15, 2016, 04 Pages, Retrieved from [https://web.archive.org/web/20160715175036/ http:/www.ardelllashes.com/Lashes/filter_108.html].
Gladgirl: "W Lashes," Mar. 23, 2016, 2 Pages, Retrieved from [https://web.archive.org/web/20160323083727/ http:/www.eyelashextensions.com/eyelashes/mink-lashes/w-lashes.html].
Gladgirl: "Knot-Free," Mar. 22, 2016, 2 Pages, Retrieved from [https://web.archive.org/web/20160322053913/ http:/www.eyelashextensions.com/eyelashes/flare-lashes/knot-free.html].
Gladlash: "Signature 4D," Jun. 27, 2016, 5 Pages, Retrieved from [https://web.archive.org/web/20160627013832/ http:/www.eyelashextensions.com/eyelashes/mink-lashes/volume-fans/glad-lash-signature-4d.html].
Gladlash: "Knot-Free W Lash Off the Tray," Jun. 30, 2016, 5 Pages, Retrieved from [https://web.archive.org/web/20160630041938/ http:/www.eyelashextensions.com/eyelashes/mink-lashes/w-lashes/knot-free-w-lash-off-the- tray.html].
Hollyren: "Beautiful Knot Free Flare Eyelashes for Daily Life #H03," Jun. 11, 2016, 4 Pages, Retrieved from [https://web.archive.org/web/20160611120459/ http://www.hollyren.com/Beautiful-Knot-Free-Flare-Eyelashes-For-Daily-Life-H03_215.html].
Hollyren: "Natural Look Tipped Criss Cross False Eyelash #BY05," May 29, 2016, 2 Pages, Retrieved from [https://web.archive.org/web/20160529101843/ http:/www.hollyren.com/Natural-Look-Tipped-Criss-Cross-False-Eyelash-BY05_46.html].
Hollyren: "Quotation of EyeLash Extensions 2013," Jul. 12, 2023, 1 Page, Exhibit F-3 Summary Chart, Defendant's Final Invalidity Contentions, United States District Court for the Western District of Texas—Waco Division, Case No. 6:22-cv-00776-ADA-DTG, *Lashify Inc*, v. *Qingdao Lashbeauty Cosmetic Co, Ltd. d/b/a Worldbeauty and Qingdao Hollyren Cosmetics Co, Ltd. d/b/a Hollyren*.
Hollyren: Super Soft Faux Mink False Eyelashes SS03, May 28, 2016, 2 Pages, Retrieved from [https://web. archive.org/web/20160528090621/ http:/www.hollyren.com/Super-Soft-Faux-Mink-False-Eyelashes-SS03_4812.html].
Hollyren: Super Soft Faux Mink False Eyelashes SS06, May 28, 2016, 2 Pages, Retrieved from [https://web.archive.org/web/20160528084206/ http:/www.hollyren.com/Super-Soft-Faux-Mink-False-Eyelashes-SS06_4815.html].
Hollyren: "Super Soft Faux Mink False Eyelashes SS08," Qingdao Hollyren Cosmetics Co., Ltd, May 28, 2016, 02 Pages, Retrieved from [https://web.archive.org/web/20160528094955/ http:/www.hollyren.com/Super-Soft-Faux-Mink-False-Eyelashes-SS08_4817.html].
Hollyren: "Super Soft Faux Mink False Eyelashes SS11" Qingdao Hollyren Cosmetics Co., Ltd, May 28, 2016, 02 Pages, Retrieved from [https://web.archive.org/web/20160528144715/ http:/www.hollyren.com/Super-Soft-Faux-Mink-False-Eyelashes-SS11_4820.html].
I.Envy By Kiss: "Quattro Collection Ad," Hype Hair Magazine, Nov. 2015, vol. 22(8), 1 Page.
I.Envy: "Knot-Free," Jan. 31, 2015, 2 Pages, Retrieved from [https://web.archive.org/web/20150131220543/ http:/ienvybykiss.com/2013/portfolio-type/knot-free/].
I.Envy: "Trio Lash-KPECO1UB/02US," Jan. 31, 2015, 2 Pages, Retrieved from [https://web.archive.org/web/20150131220846/ http:/ienvybykiss.com/2013/portfolio/trio-lash-kpec01ub02ub/].
Japonesque: "Sectional 4 Lashes," Aug. 10, 2014, 1 Page, Retrieved from [https://web.archive.org/web/20140810125817/ http:/japonesque.com/lashes-brows/false-lashes/eyelash-sectional-4].
Japonesque: "Sectional 4 Lashes," Oct. 2, 2024 4 Pages, Retrieved from [https://www.amazon.com/ JAPONESQUE-ZM-410-Sectional-4-Eyelashes/dp/B0038R1WOU/ref=cm_cr_arp_d_pl_foot_top?ie=UTF8].
Japonesque: "False Lashes—Lashes Brows", Aug. 8, 2014, Retrieved from [https://web.archive.org/web/20140808235016/ http:/japonesque.com/lashes-brows/false-lashes].
Kiss: "Ever EZ Lashes Single Pack," The Wayback Machine, Jan. 1, 2015, 02 Pages, Retrieved from [https://web. archive.org/web/20150101185551/ http://www.kissusa.com/lashes/ever_ez_lashes/everez_lashes_single_pack#. VKWYPnbP1qY].
Long Tai LT-004 Lashes: "Exhibit A-39, Defendant's Final Invalidity Contentions," Jul. 12, 2023, United States District Court for the Western District of Texas—Waco Division, Case No. 6:22-cv-

(56) References Cited

OTHER PUBLICATIONS

00776-ADA-DTG, *Lashify Inc*, v. *Qingdao Lashbeauty Cosmetic Co, Ltd. d/b/a Worldbeauty and Qingdao Hollyren Cosmetics Co, Ltd. d/b/a Hollyren*, 1 Page.
Madame Madaline: "Ardell Duralash Naturals Long Length," Sep. 10, 2025, 3 Pages, Retrieved from [https://web.archive.org/web/20150910130146/https:/www.madamemadeline.com/online_shoppe/proddetail.asp?prod=adl_I].
Madame Madaline: Ever EZ Kiss Premium Lashes, Kiss Premium Eyelashes, Madame Madaline, Apr. 10, 2016, 05 Pages, Retrieved from [https://web.archive.org/web/20160410103057/https:/www.madamemadeline.com/online_shoppe/products.asp?cat=EVER+EZ+LASHES+by+Kiss].
Madame Madeline: "Ardell Duralash Knot-Free Double Individual Lashes Medium," May 6, 2016, 3 Pages, Retrieved from [https://web.archive.org/web/20160506015523/https:/www.madamemadeline.com/online_shoppe/ proddetail.asp?prod=mm61485].
Madame Madeline: "Ardell Duralash Knot-Free Double Individual Lashes Short," May 6, 2016, 3 Pages, Retrieved from [https://web.archive.org/web/20160506053149/https:/www.madamemadeline.com/online_shoppe/proddetail.asp? prod=mm61484].
Madame Madeline: "Ardell Duralash Naturals Combo Pack," Sep. 10, 2015, 3 Pages, Retrieved from [https://web.archive.org/web/20150910090349/https:/www.madamemadeline.com/online_shoppe/proddetail.asp? prod=mm65063].
Madame Madeline: "Ardell Duralash Naturals Medium Length," Sep. 10, 2015, 3 Pages, Retrieved from [https://web.archive.org/web/20150910130347/https:/www.madamemadeline.com/online_shoppe/proddetail.asp? prod=adl_ml].
Madame Madeline: "Ardell Duralash Naturals Short Length," Sep. 10, 2015, 3 Pages, Retrieved from [https://web.archive.org/web/20150910130042/https:/www.madamemadeline.com/online_shoppe/proddetail.asp?prod=adl_s].
Madame Madeline: "Ardell False Eyelashes Accessories, Invisi Bands Lash Lites Eyelashes," False Eyelashes, Apr. 10, 2016, 05 Pages, Retrieved from [https://web.archive.org/web/20160410124330/https:/www.madamemadeline.com/online_shoppe/products.asp?cat=Ardell+InvisiBands+%26+LashLites+Eyelashes].
Madame Madeline: "Ardell InvisiBands Demi Luvies," Ardell InvisiBands LashLites Eyelashes, Sep. 10, 2015, 03 Pages, Retrieved from [https://web.archive.org/web/20150910131057/https:/www.madamemadeline.com/online_shoppe/proddetail.asp?prod=ail_dlv].
Madame Madeline: "Ardell InvisiBands Demi Wispies (New Packing)," Ardell InvisiBands LashLites Eyelashes, Sep. 10, 2015, 03 Pages, Retrieved from [https://web.archive.org/web/20150910130919/https:/www.madamemadeline.com/online_shoppe/proddetail.asp?prod=mm65012].
Madame Madeline: "Ardell Invisibands Wispies (New Packaging)," Sep. 21, 2015, 3 Pages, Retrieved from [https://web.archive.org/web/20150921002822/https:/www.madamemadeline.com/online_shoppe/proddetail.asp? prod=ail_wn].
Madame Madeline: Ardell Invisibands Wispies, Sep. 10, 2015, 3 Pages, Retrieved from [https://web.archive.org/web/20150910130131/https:/www.madamemadeline.com/online_shoppe/proddetail.asp?prod=ail_w].
Madame Madeline: "Ardell Lash Trios Individual Long Black," Jul. 16, 2017, 3 Pages, Retrieved from [https://web.archive.org/web/20170720061842/https:/www.madamemadeline.com/online_shoppe/products.asp?cat=Ardell +Individual+Trios+Lashes].
Madame Madeline: "Ever-Ez Kiss Premium Lashes 11," Madame Madeline, Jul. 8, 2016, 03 Pages, Retrieved from [https://web.archive.org/web/20160708105446/https:/www.madamemadeline.com/online_shoppe/proddetail.asp? prod=mmKPL01].
Madame Madeline: "I.Envy Individual Lashes Classic Flare Combo (KPE03)," Sep. 11, 2015, 5 Pages, Retrieved from [https://web.archive.org/web/20150911044752/https:/www.madamemadeline.com/online_shoppe/products.asp?cat=i-ENVY+Individual+Lashes+by+KISS].
Madame Madeline: "I.Envy Individual Lashes Knot Free Combo KPE06," Sep. 11, 2015, 3 Pages, Retrieved from [https://web.archive.org/web/20150911110942/https:/madamemadeline.com/online_shoppe/proddetail.asp? prod=mmKPE06].
Madame Madeline: "I-Envy Individual Lashes Trio Medium (KPEC02)," Sep. 27, 2015, 3 Pages, Retrieved from [https://web.archive.org/web/20150927140415/https:/www.madamemadeline.com/online_shoppe/proddetail.asp? prod=mmKPEC02].
Madame Madeline: "I.Envy Individual Lashes Trio Short (KPEC01)," Sep. 30, 2015, 3 Pages, Retrieved from [https://web.archive.org/web/20150930045649/https:/madamemadeline.com/online_shoppe/proddetail.asp? prod=mmKPEC01].
Madame Madeline: "I-Envy Individual Lashes Trio Ultra Black Short (KPEC01UB)," Sep. 29, 2015, 3 Pages, Retrieved from [https://web.archive.org/web/20150929123306/https:/madamemadeline.com/online_shoppe/proddetail.asp?prod=mmKPEC01UB].
Premier Lashes: "Exhibit A-42, Defendant's Final Invalidity Contentions," Jul. 12, 2023, United States District Court for the Western District of Texas—Waco Division, Case No. 6:22-cv-00776-ADA-DTG, *Lashify Inc*, v. *Qingdao Lashbeauty Cosmetic Co, Ltd. d/b/a Worldbeauty and Qingdao Hollyren Cosmetics Co, Ltd. d/b/a Hollyren*, 4-5 Pages.
Office Action for Chinese Patent Application No. 202110625150.1, mailed Aug. 30, 2024, 27 Pages.
Office Action for Japanese Patent Application No. 2023149877, mailed Jul. 1, 2024, 10 pages.
Office Action for Korean Patent Application No. 10-2020-7012359, mailed Jun. 10, 2024, 13 Pages.
Adhesive: "Japonesque Sectional 4 Eyelashes," Sep. 26, 2024, 3 Pages, Retrieved from [https://www.amazon.com/JAPONESQUE-ZM-410-Sectional-4- Eyelashes/dp/B0038R1WOU/ref=cmcr_arp_d_pl_foot_top? ie=UTF8].
Ardell: "Lash Lites," The Wayback Machine, Jul. 15, 2016, 02 Pages, Retrieved from [https://web.archive.org/web/20160715175102/http://www.ardelllashes.com/Lashes/filter_41.html].
Ardell: "Lashes—Demi Wispies," Jun. 29, 2016, 1 page, Retrieved from https://web.archive.org/web/20160629220043/ http:/www.ardelllashes.com/Lashes/product_237.html.
"Ardell: Lashes Index," Jul. 15, 2016, Retrieved from [https://web.archive.org/web/20160715175029/ http:/www.ardelllashes.com/Lashes/index.html].
Ardell: "Lashes-Lash Trios," Jul. 15, 2016, 1 Page, Retrieved from [https://web.archive.org/web/20160715175032/ http://www.ardelllashes.com/Lashes/product_238.html].
Ardell: "Lashes-Long Black" Jul. 8, 2016, 1 Page, Retrieved from [https://web.archive.org/web/20160715175032/ http://www.ardelllashes.com/Lashes/product_238.html].
Beaute4U: "Stars Colors Eyelashes Soft Grafting Eyelash Extension Thick Style 20 Hairs Rabbit anti-Lashes XEB-009," Ideal Beaumax Marketing, Sep. 26, 2024, Retrieved from [https://beaute4u.com/index.php? id_product=56amp; controller=product].
Camie-Cameron: "How to Apply Individual Lashes Underneath the Eyelid," Camie Cameron Video, Jun. 27, 2016, 31 Pages, Retrieved from [https://www.youtube.com/watch?v=CabxTEY9qjc].
Edmarys: "Eyelash Hack | Reverse Lash Tutorial," Edmarys Video, Jan. 27, 2017, 22 Pages, Retrieved from [https://www.youtube.com/watch?v=NprJRiAQAi8].
"Fing'rs Lash Pocket," Oct. 1, 2024, 3 Pages, Retrieved from [https://www.amazon.de/-/en/Fing%60rs-Lashes-%20pocket/dp/B00ANLZTJS/ref=sr_1_1?qid=1686689361refinements=p_89%3AFing%60rs s=beautysr=1-1].
Glad Girl: "Glad Lash Signature 5D—vol. Fans—Mink Lashes Eyeslashes," Jun. 30, 2016, 3 pages, Retrieved from https://web.archive.org/web/20160630100924/ http:/www.eyelashextensions.com/eyelashes/mink-lashes/volume-fans/glad-lash-signature-5d.html.
Glad Girl: "Glad Lash Signature Double Configuration D Y Eyelashes," Sep. 26, 2024, 3Pages, Retrieved from [https://www.gladgirl.com/products/glad-lash-signature-double-configuration-2d-y-eyelashes?srsltid=AfmBOoqEbsioiLD0iJPG4gdT1JyfJq7Z32u6_9fhODFwjWJV9vRN_Uoamp;variant=31337154150452].

(56) References Cited

OTHER PUBLICATIONS

Glad Girl: "Knot-Free Flare Lashes—Eyelashes," Feb. 24, 2016, 3 Pages, Retrieved from https://web.archive.org/web/20160224231654/http:/www.eyelashextensions.com/knot-free-medium-10-hair-7261.html.
Gladgirl: "Glad Lash Belle Strip Lash Application—Under Lash Line Technique," Eyelash Extension Supplies, Jan. 31, 2014, 10 Pages, Retrieved from [https://www.youtube.com/watch?v=6xnLNxbqVKM].
Gladgirl: "Glad Lash Demi Whispy Strip Lash Application—Under Lash Line Technique," Eyelash Extension Supplies, Jun. 3, 2013, 11 Pages, Retrieved from [https://www.youtube.com/watch?v=Fpsr-XgWQwk].
"Gladgirl: Lash Index," Mar. 10, 2016, 3 Pages, Retrieved from [https://web.archive.org/web/20160310145533/ http:/www.eyelashextensions.com/eyelashes.html].
Guglielmo A.D., "The New Way To Apply False Lashes," Stylecaster, Feb. 6, 2015, 2 Pages, Retrieved from [https://web.archive.org/web/20160201132329/ http://stylecaster.com/beauty/false-eyelashes-application-tip/].
"Hollyren: False Eyelashes," Jun. 11, 2016, 2 Pages, Retrieved from [https://web.archive.org/web/20160611120415/ http:/www.hollyren.com/all-categories.html].
Hollyren: "Make Beauty Easier, Individual Flare Lashes," Jun. 11, 2016, 3 Pages, Retrieved from https://web.archive.org/web/20160611032519/ http:/www.hollyren.com/Individual-Flare-Lashes_cpid9.
Hollyren: "Make Beauty Easier, Regular Lashes, Beautiful Fashion False Eyelash For Daily Life #A02 products," Jun. 10, 2016, 2 Pages, Retrieved from https://web.archive.org/web/20160610231445/http:/www.hollyren.com/Regular-Lashes_cpid12.
Hollyren: "Make Beauty Easier, Super Soft Faux Mink False Eyelashes products," Apr. 6, 2016, 2 Pages, Retrieved from https://web.archive.org/web/20160406204549/ http:/www.hollyren.com/Faux-Mink-False-Eyelashes_cpid38.
Hollyren: "Make Beauty Easier, Tip Mellow Lashes, Natural Look Tipped Criss Cross False Eyelash #BY05," Jun. 11, 2016, 2 Pages, Retrieved from https://web.archive.org/web/20160611032812/ http:/www.hollyren.com/Tip-Mellow-Lashes_cpid3.
Husssh Sg: "How to Apply Husssh DIY Lashes," HussshSG video, May 28, 2010, 15 Pages, Retrieved from [https://www.youtube.com/watch?v=AlBSySwqsOY].
Jocelyn-Marcial: "How to Apply Strip Lashes Underneath VS on Top," Jocelyn Marcial Video, Mar. 17, 2017, 24 Pages, Retrieved from [https://www.youtube.com/watch?v=lu_ck8K4otw].
Kiss: "I Envy Knot Free Ultra Black Short (KPE04UB), Madame Madeline," Oct. 1, 2015, 3 pages, Retrieved from https://web.archive.org/web/20151001102530/https:/madamemadeline.com/online_shoppe/proddetail.asp? prod=mmKPE04UB.
Kiss: "Ever-EZ Kiss Premium Lashes 03, Ever-EZ Lashes by Kiss—Madame Madeline," Jul. 8, 2016, 2 Pages, Retrieved from https://web.archive.org/web/20160708044512/https:/www.madamemadeline.com/online_shoppe/ proddetail.asp?prod=mmKPL03.
Kiss: "I Envy by Kiss—How to Apply Individual Lashes," Nails R US Beauty Supply Ltd., Aug. 27, 2017, 17 Pages, Retrieved from [https://www.youtube.com/watch?v=qPLNB_WDJGw].
Kiss Looks So Natural False Eyelashes, Shy, 14 mm, 1 Pair, Sep. 26, 2024, 4 pages, Retrieved from https://www.walmart.com/ip/KISS-Looks-So-Natural-False-Eyelashes-Shy/34400580.
Kiss: "Strip Lashes Mul, "Haute Couture Multi Pack Lashes Wink, Sep. 26, 2014, 01 Page, Retrieved from [https://web.archive.org/web/20140926011512/ http://www.kissusa.com/lashes/haute_couture/haute_couture_lash_multipack# VCS-QnbP2Uk].
Lash'EM: "Mink Fur Horse Mane Eyelashes," Apr. 28, 2014, 02 Pages, Retrieved from [https://web.archive.org/web/20140428032020/http://www.lashemlashes.com/services.html].
Madame Madeline: "Kiss I-Envy Au Naturale," Sep. 6, 2015, 05 Pages, Retrieved from [https://web.archive.org/web/20150906170057/https:/www.madamemadeline.com/online_shoppe/products.asp?cat=i-ENVY+Strip+Lashes +by+KISS].
Madame Madeline: "Ardell Duralash Knot-Free Double Individual Lashes Long," May 6, 2016, 2 Pages, Retrieved from [https://web.archive.org/web/20160506050354/https:/www.madamemadeline.com/online_shoppe/proddetail.asp? prod=mm61496].
Madame Madeline: "Ardell Duralash Naturals Starter Kit," Sep. 10, 2015, 3 Pages, Retrieved from [https://web.archive.org/web/20150910093438/https:/www.madamemadeline.com/online_shoppe/proddetail.asp? prod=mm240462].
Madame Madeline: "Japonesque Eyelashes Sectinal 4," Japonesque False Eyelashes, Sep. 10, 2015, 3 Pages, Retrieved from [https://web.archive.org/web/20150910073702/https:/www.madamemadeline.com/online_shoppe /proddetail.asp?prod=jpn410].
Madame Madeline: "Kiss i-Envy Au Naturale Multi-Pack 01 (KPEM08)," Strip Lashes by Kiss-Madame Madeline, Sep. 10, 2015, 02 Pages, Retrieved from [https://web.archive.org/web/20150910075201/https://www.madamemadeline.com/online_shoppe/proddetail.asp?prod=mmKPEM08].
Marilyn: "Ardell False Lashes Including the New Color Impact—Review, Photos and Looks," Mar. 6, 2013, 12 Pages, Retrieved from [https://weheartthis.com/ardell-false-lashes-including-the-new-color-impact-review-photos-and-looks/].
"MATA: Mahkota Tri Angjaya," Jul. 12, 2016, 1 Page, Retrieved from [https://web.archive.org/web/20160712154019/ http:/www.mata-lashes.com].
MATA: "Process of Making Flare Eyelashes," PT. Mahkota Tri Angjaya, Nov. 12, 2015, 16 Pages, Retrieved [https://www.youtube.com/watch?v=UuJ3WNqiZWM].
Pretty Casual: "Lashtite Glue DIY Eyelash Extensions - Apply Under My Lashes For A More Natural Look!," Mar. 26, 2016, 42 Pages, Retrieved from [https://www.youtube.com/watch?v=Td6Bi9aVmeQ].
Queenie-Chan: "Invisible Eyelash Extension Method—How to Apply False Eyelashes in a Special Way," BeautyQQ, Aug. 9, 2009, 20 Pages, Retrieved from [https://www.youtube.com/watch?v=lal-QMuLByU].
Steale02: "How to Apply Individual Lashes," Steale02 Video, Apr. 5, 2010, 35 Pages, Retrieved from [https://www.youtube.com/watch?v=9X84CUIWqgo].
Toni Valentine: "How to Apply Individual Lashes," Mar. 16, 2013, 101 Pages, Retrieved from [https://www.youtube.com/watch?v=aLHE2SqzIO].
Wayback Machine: "Slim Partial—Accent Lashes by Shu Uemura Art of Beauty", Feb. 1, 2013,Page 1, Retrieved from https://web.archive.org/web/20130201021908/ http:/www.shuuemura-USA.com/_us/_en/accessories/ false-eyelashes/accent/slim-partial.htm.
"WorldBeauty: Knot Free Flare Lashes", Aug. 17, 2012, 3Pages, Retrieved from [https://web.archive.org/web/20120817103827/ http:/www.worldbeautylashes.com:80/category/flare-eyelashes.html].
Shu Uemura: "Slim Partial," Dec. 14, 2011, 1 Page, Retrieved from [https://web.archive.org/web/20111214144618/ http:/www.shuuemura-USA.com/_us/_en/accessories/false-eyelashes/accent/slim-partial.htm].
Walmart: Customer Reviews for KISS Looks So Natural, False Eyelashes, Shy, 14 mm, 1 Pair, 02 Pages, [Retrieved on Oct. 3, 2024], Retrieved from [https://www.walmart.com/reviews/product/34400580].
"WorldBeauty: Knot Free Flare Lashes," Exhibit A-44, Defendant's Final Invalidity Contentions, Jul. 12, 2023, 1 Page, United States District Court for the Western District of Texas - Waco Division, Case No. 6:22-cv-00776-ADA-DTG, *Lashify Inc*, v. *Qingdao Lashbeauty Cosmetic Co, Ltd. d/b/a Worldbeauty and Qingdao Hollyren Cosmetics Co, Ltd. d/b/a Hollyren.*
Office Action for Singapore Patent Application No. 11202107264P, mailed Sep. 10, 2024, 6 Pages.
Blinc: Blinc Heated Lash Curler, Heated Eyelash Curler Comb, Electric Eyelash Curler For Long Lasting Curls, Battery Included, , Reviewed on Dec. 2015, 1 Page, Retrieved from [https://www.amazon.com/Eyelash-Electric-Lasting-Battery-Included/dp/B000LJCNFA/ref=sr_1_26?dib=eyJ2ljoiMSJ9. g2WgUKFLa50bQ2j1].

* cited by examiner

400

APPLICATOR FOR ARTIFICIAL LASH EXTENSIONS

CROSS-REFERENCE TO RELATED APPLICATIONS

This application is a continuation application of U.S. patent application Ser. No. 17/669,281, filed Feb. 10, 2022, which is a continuation application of U.S. patent application Ser. No. 16/867,391, filed May 5, 2020, now issued as U.S. Pat. No. 11,278,102, issued on Mar. 22, 2022, which is a divisional of U.S. patent application Ser. No. 15/968,453, filed on May 1, 2018, now issued as U.S. Pat. No. 10,638,826, issued on May 5, 2020, which is a continuation of International Application No. PCT/US17/67513, filed on Dec. 20, 2017, which claims priority to U.S. Provisional Application No. 62/436,585, filed on Dec. 20, 2016, the entire contents of all are hereby incorporated herein by reference in their entirety.

FIELD OF THE INVENTION

Various embodiments concern cases for housing artificial eyelashes and applicators for applying artificial eyelashes to the underside of an individual's natural eyelashes.

BACKGROUND

Eyelash extensions have conventionally been used to enhance the length, thickness, and fullness of natural eyelashes. Eyelash extensions, however, must be applied to an individual's natural eyelashes one by one to avoid having the eyelash extensions stick together. Consequently, lash extension services can cost hundreds of dollars depending on the type and number of lashes used, the skill of the cosmetician, and the venue where the eyelash extensions are applied. It usually takes an experienced cosmetician one to two hours to attach a full set of eyelash extensions.

Clusters of artificial lashes have conventionally been used to enhance the length, thickness, and fullness of an individual's natural eyelashes. However, each cluster must be applied to the individual's eyelashes individually in order to avoid having the clusters of artificial lashes stick together and to ensure multiple clusters are evenly distributed across the width of the individual's lash line.

Alternatively, false eyelashes may be applied directly to an individual's eyelid. False eyelashes come in strips (and thus may also be referred to as "strip lashes") that can be trimmed to fit the width of the individual's eyelid. While a strip of false eyelashes can be applied in a single motion, false eyelashes are easily distinguishable from the individual's natural eyelashes and may be uncomfortable when worn for extended periods of time.

BRIEF DESCRIPTION OF THE DRAWINGS

Various embodiments are illustrated by way of example and not limitation in the accompanying drawings, in which like references indicate similar elements. Various objects, features, and characteristics of the present invention will become more apparent to those skilled in the art from a study of the Detailed Description in conjunction with the drawings.

Figure 1:
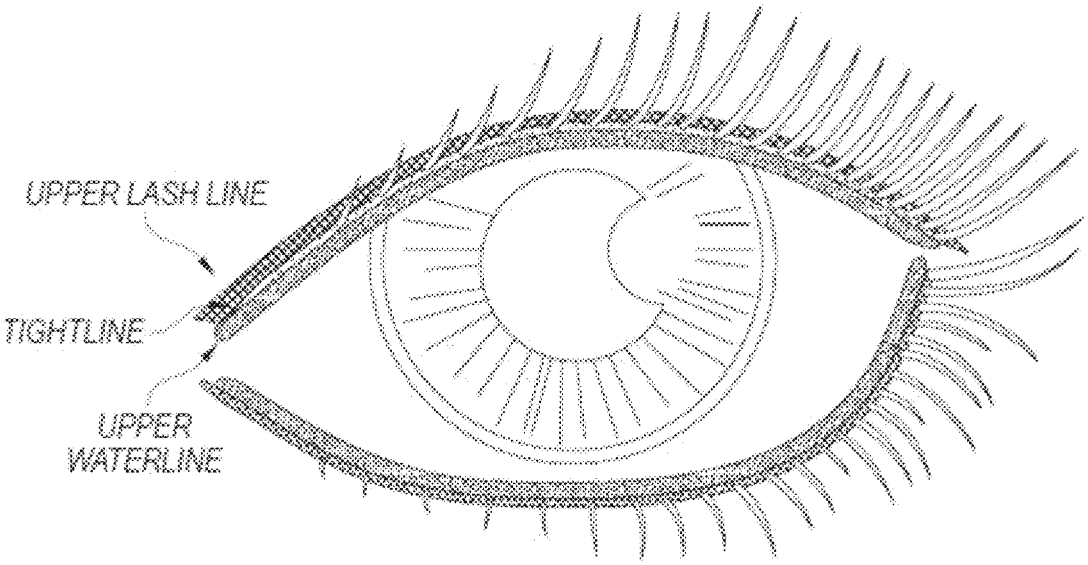
FIG. 1 depicts the upper tightline, upper lash line, and upper waterline of an eyelid.

The figures depict various embodiments for the purpose of illustration only. Those skilled in the art will readily recognize that alternative embodiments may be employed without departing from the principles of the present invention. The claimed subject matter is intended to cover all modifications, equivalents, and alternatives falling within the scope of the present invention as defined by the appended claims.

DETAILED DESCRIPTION

Conventional eyelash extensions (or simply "lash extensions") are individually adhered to an individual's natural eyelashes one-by-one in order to prevent the eyelash extensions from sticking together. However, because the average individual might have anywhere from thirty to eighty natural lashes per eye, the application process can take several hours to attach a full set of lash extensions.

Introduced here are cases for housing sets of artificial lash extensions that can be applied to an individual's natural lashes. Each set of artificial lash extensions can include multiple lash fusions, and each lash fusion can include multiple clusters of artificial lashes. These clusters include multiple artificial hairs made of natural materials (e.g., silk or authentic mink hair) or synthetic materials (e.g., acrylic resin, polybutylene terephthalate (PBT), or synthetic mink hair made of polyester). A cluster of artificial lashes generally includes approximately 10 to 30 artificial hairs (and preferably 10 to 20 artificial hairs). While certain embodiments have been described in the context of lash fusions that include multiple clusters, those skilled in the art will recognize that a lash fusion could also include a series of individual artificial hairs that are connected to one another.

Multiple clusters of artificial lashes are often formed into bundles called "lash fusions." The base of a lash fusion (e.g., where multiple clusters are fused together) is intended to be affixed to an individual's natural lashes. A lash fusion may be approximately 4-8 millimeters (mm) wide. A lash fusion could also include 3-10, 3-7, 5-10, 5-7, or 4-6 clusters. Accordingly, a lash fusion could include 30-150, 30-120, or 30-90 individual artificial hairs. A set of artificial lash extensions can then be formed by positioning multiple lash fusions next to one another in an arrangement that substantially matches the curvature of the upper tightline along the base of the eyelid.

While the multiple lash fusions included in a set of artificial lash extensions are typically not connected to one another (e.g., are not fused together using heat, an adhesive, etc.), the entire set of artificial lash extension can be applied to the underside of the individual's natural lashes in a single motion by an applicator. Thus, the multiple lash fusions in a set of artificial lash extensions may be arranged to match the curvature of an eyelid, as well as an applicator designed to facilitate fixation of the entire set of artificial lash extensions to an individual's natural lashes. A set of artificial lash extensions could include 3-8, 3-5, 5-8, or 4-6 lash fusions. Accordingly, a set of artificial lash extensions could include 150-360 individual artificial hairs.

Also introduced here are applicators for resiliently grasping the multiple lash fusions in a set of artificial lash extensions, and then simultaneously applying the multiple lash fusions along the upper tightline in a single motion. As shown in FIG. 1, the upper tightline is interposed between the upper lash line and the upper waterline. An applicator includes opposed arms that are connected to one another at an inner end (also referred to as the "proximal end") that is gripped by an individual. The applicator can also include an outer end (also referred to as the "distant end" or the "distal end") having a concave (e.g., crescent) shape that is contoured to be substantially flush with the convex shape of the upper tightline. The concave shape of the applicator may also substantially complement the predefined indentations within cases that are responsible for holding sets of artificial lash extensions. Applicators are often comprised of metal (e.g., stainless steel, hardened steel, or titanium) to increase the durability and grasping precision of the opposed arms.

An adhesive may be applied to the top of each lash fusion in a set of artificial lash extensions during the manufacturing process, which enables an individual to easily apply the set of artificial lash extensions directly to the underside of the natural lashes rather than to the eyelid. Additionally or alternatively, the individual could apply an adhesive before applying the set of artificial lash extensions to the underside of the natural lashes. For example, the individual may apply an adhesive to each lash fusion before applying the set of artificial lash extensions to the natural lashes. As another example, the individual may apply an adhesive directly to the natural lashes. Thus, the adhesive could be a waterproof glue or mascara.

Terminology

Brief definitions of terms, abbreviations, and phrases used throughout this application are given below.

Reference to "one embodiment" or "an embodiment" means that a particular feature, structure, or characteristic described in connection with the embodiment is included in at least one embodiment of the disclosure. The appearances of the phrase "in some embodiments" are not necessarily referring to the same embodiment, nor are they necessarily referring to separate or alternative embodiments that are mutually exclusive of one another.

The terms "connected," "coupled," or any variant thereof includes any connection or coupling between two or more elements, either direct or indirect. The coupling or connection between the elements can be physical, logical, or a combination thereof. For example, two components may be coupled directly to one another or via one or more intermediary channels/components. The words "associate with," meanwhile, mean connecting or relating objects, items, etc.

System Topology Overview

Figure 2:
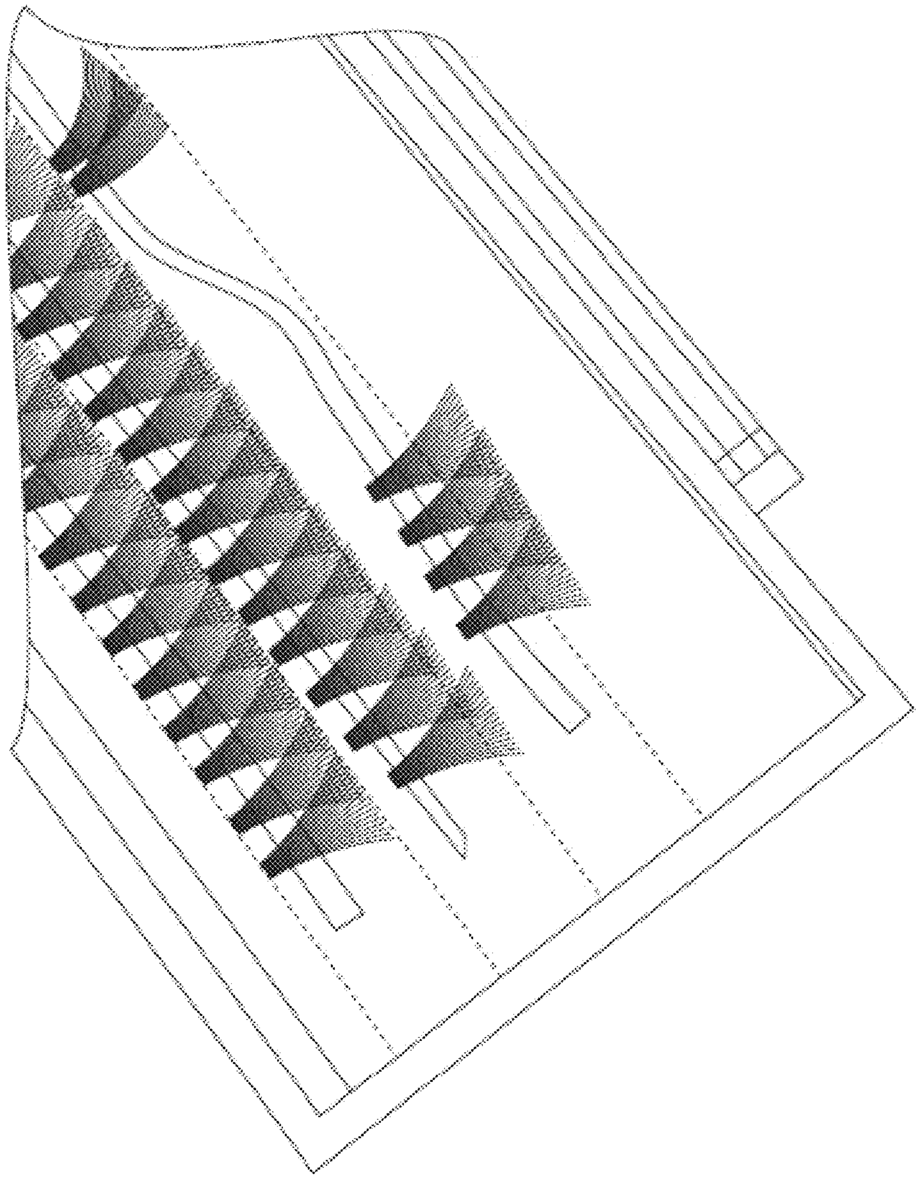
FIG. 2 depicts clusters of artificial lashes that can be used by professional lash technicians and cosmeticians.

FIG. 2 depicts clusters of artificial lashes that can be used by professional lash technicians and cosmeticians. Each cluster of artificial lashes includes multiple artificial hairs that consist of natural materials (e.g., silk or authentic mink hair) or synthetic materials (e.g., acrylic resin, PBT, or synthetic mink hair made of polyester).

Clusters of artificial lashes typically include 10 to 30 artificial hairs that are heated (e.g., as part of a holt melt process) and then secured to one another. For example, in some embodiments linear artificial hairs are heated at one end such that they begin to fuse to one another at that end, while in other embodiments linear artificial hairs are heated near a central point and folded underneath one another.

In some embodiments, some or all of the artificial hairs in a cluster may be tied to a support thread (i.e., knotted). The artificial hairs may be tied by any such means, such as a slip know that prevents horizontal spreading of the cluster.

Figure 3A:
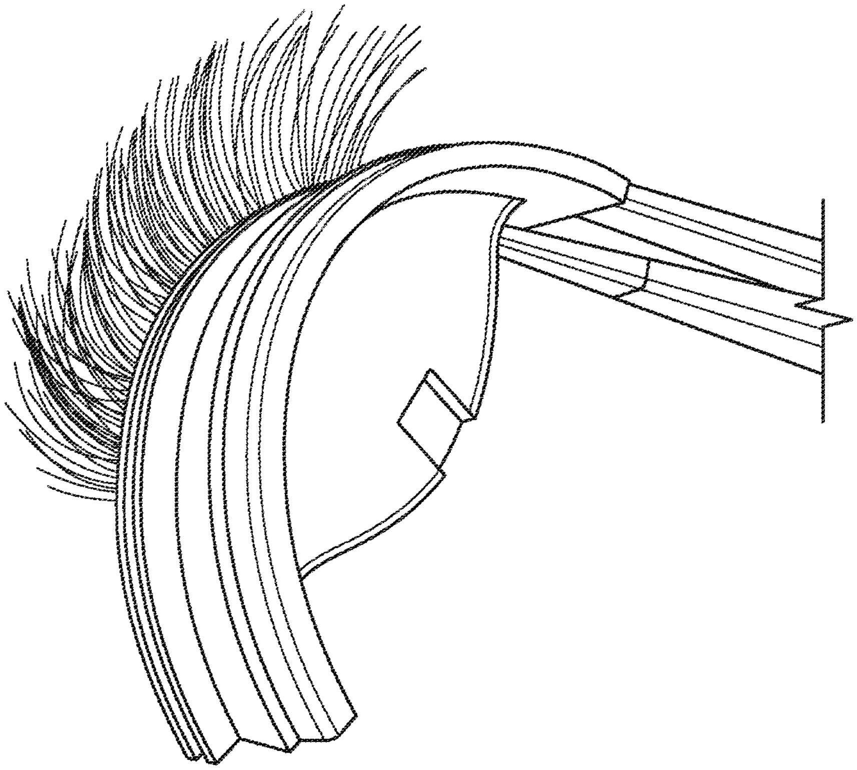
FIGS. 3A-B depict how a set of artificial lash extensions can be affixed beneath the individual's natural lashes.
Figure 3B:
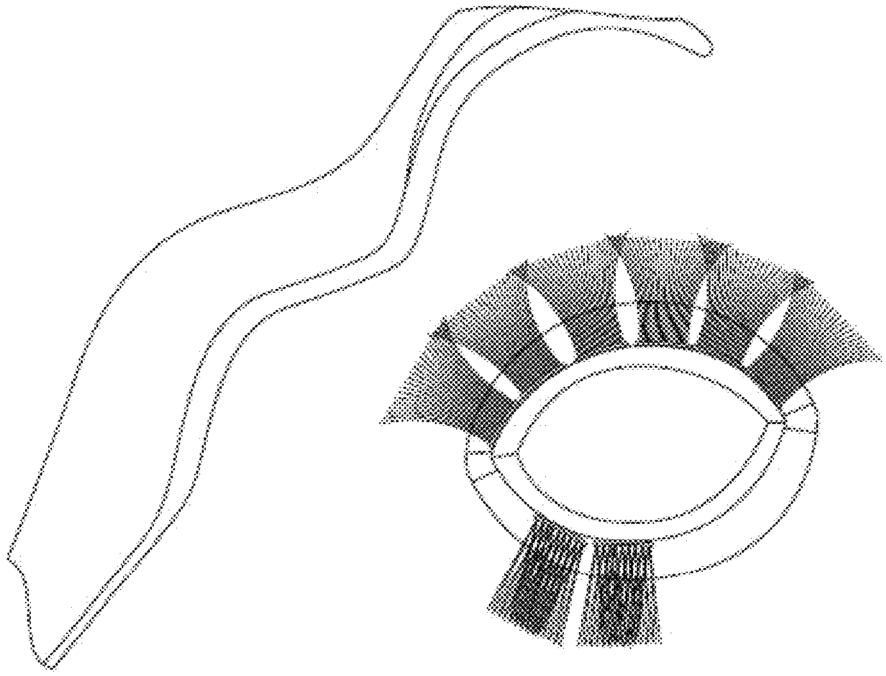

FIGS. 3A-B depict how a set of artificial lash extensions can be affixed to the underside of an individual's natural lashes. More specifically, FIG. 3A is a perspective view of a set of artificial lash extensions from above, while FIG. 2B is a view of the set of artificial lash extensions from below.

A set of artificial lash extensions can include multiple lash fusions that are arranged to match the curvature of the upper tightline of an eyelid. For example, multiple lash fusions may be arranged such that the inner ends (i.e., the bases) form a concave shape that substantially complements the universal tightline of nearly any human eye. In some embodiments, sets of artificial lash extensions preferably include 5-7 distinct clusters of artificial lashes. The number of lash fusions in each set (as well as the number of clusters in each lash fusion) may be based on the thickness of the artificial hair used, the desired style of the eyelid on which the set is intended to be affixed, the desired lash density (also referred to as the "fullness" of the individual's lashes), etc. As shown in FIG. 3B, the set of artificial lash extensions is aligned with the tightline rather than the lash line, and then affixed to the underside of the natural lashes. Said another way, the set of artificial lash extensions is applied directly to the underside of the natural lashes rather than to the eyelid.

An adhesive can be applied to the top of each lash fusion in the set of artificial lash extensions, which enables an individual to easily apply the entire set directly to the natural lashes. The individual responsible for applying the set of artificial lash extensions could be a person who affixes the multiple lash fusions to herself or some other person (e.g., a professional lash technician or a cosmetician). In some embodiments, the adhesive is applied when each lash fusion and/or the set of artificial lash extensions are initially manufactured. Additionally or alternatively, the individual could apply an adhesive before attaching the set of artificial lash extensions to the natural lashes.

The adhesive could be a waterproof (semi-permanent) glue, mascara, or some other co-polymer solution having an adhesive quality. Although latex-based adhesives are generally avoided to avoid irritation of the individual's eyelid (e.g., due to an allergic reaction), adhesives can include various other natural and/or chemical ingredients. Examples of possible adhesives include:

Arcrylates/ethylhexyl acrylate copolymer, aqua, propylene glycol, ceteareth-25, hydrogenated castor oil, glycerin, phenoxyethanol, 2-bromo-2-nitropropane-1, 3-diol, methylcholoroisothiazolinone, methylisothiazolinone, methylparaben, and optionally a color agent (e.g., black 2 (Cl 77266));

Polyterpene, styrene/isoprene copolymer, petrolatum, polyisobutene, microcrystalline wax (cera microcristalina, cire microcrystalline), hydrogenated styrene/methyl styrene/indene copolymer, styrene/VA copolymer, and optionally an antioxidant (e.g., butylated hydroxytoluene (BHT));

Chlorine dioxide, p-anisic acid, biotin, lavandula angustifolio oil, propylene glycol, water, 2-ethylhexyl acrylate, and optionally a preservative (e.g., benzalkonium chloride); and Acrylate copolymer and water.

Those skilled in the art will recognize that many other adhesive compositions are possible and, in fact, may be desirable for individuals having certain allergies, desiring certain fixation duration (also referred to as "permanency" of the lash extensions), etc.

Semi-permanent clusters of lash extensions may be applied with a Federal Drug Administration-approved (FDA-approved) adhesive that achieves a strong bond. Such adhesives generally include cyanoacrylate. Different types of cyanoacrylates (e.g., ethyl, methyl, propyl, butyl, and octyl) have been designed for bonding to different surfaces. For example, adhesives made from methyl-2-cyanoacrylateare are designed to bond a smooth surface (e.g., the lash extension) to a porous surface (e.g., the natural eyelash), but not on the skin as it may cause irritation.

Figure 4A:
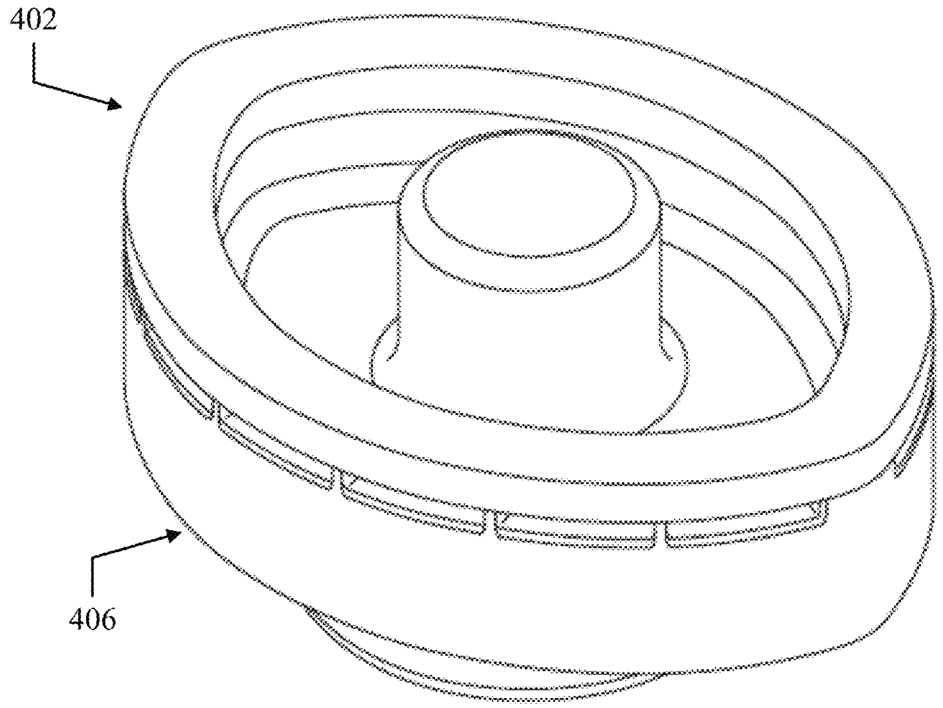
FIGS. 4A-C depict several different views of a case for holding a set of artificial lash extensions.
Figure 4B:
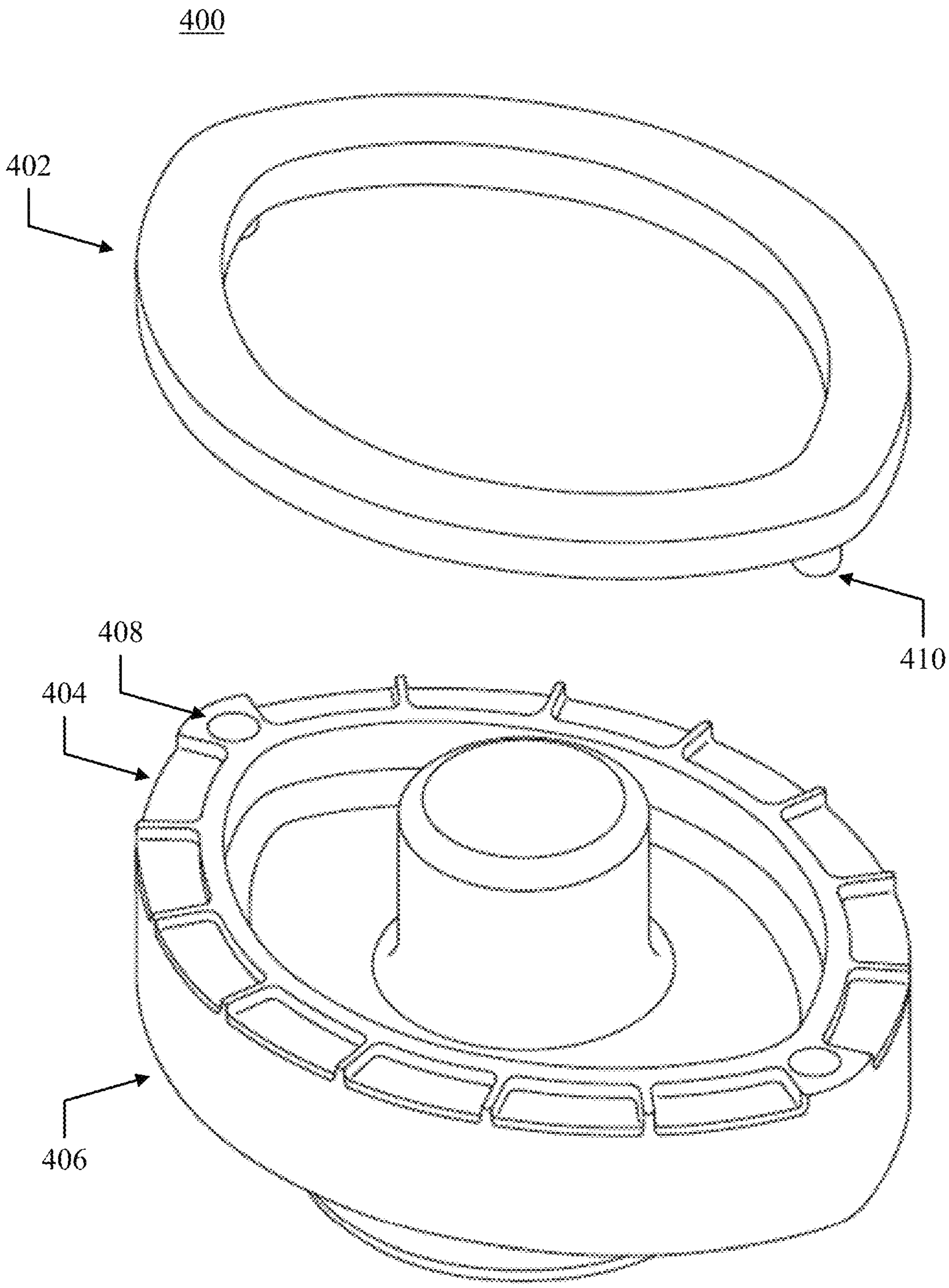
Figure 4C:
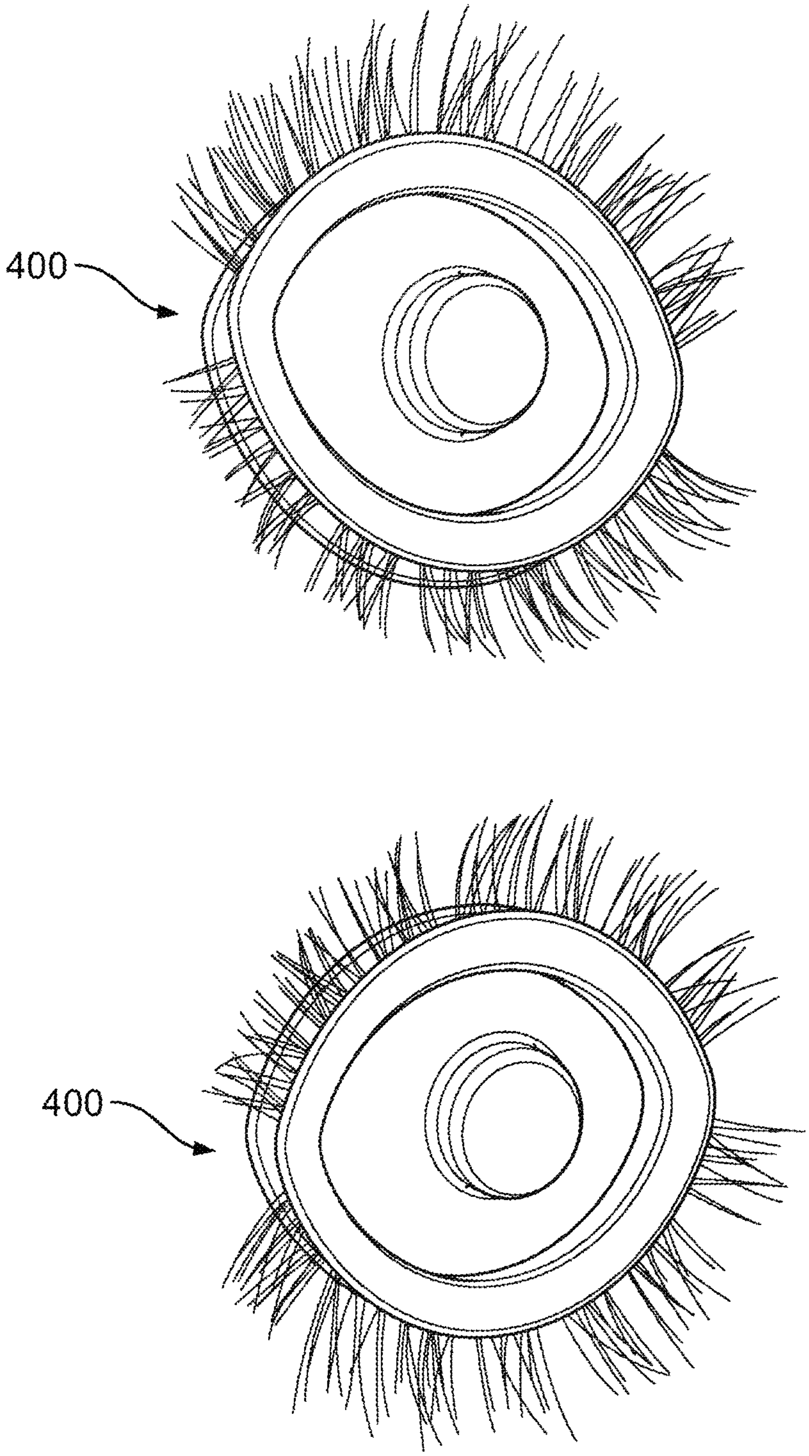

FIGS. 4A-C depict several different views of a case 400 for holding artificial lash extensions. FIG. 4A is a perspective view of the case 400, while FIG. 4B is an exploded view of the case 400 in which the upper cover 402 has been removed to expose multiple predefined indentations 404 within a base assembly 406.

The case 400 may include a base assembly 406 and an upper cover 402 that partially or entirely shields the predefined indentations 404. In some embodiments, the base assembly 406 includes one or more fastener holes 408 that allow fasteners to be used to attach the upper cover 402 to the base assembly 406. One example of a fastener is a fastener boss 410. Other embodiments may provide other means of attachment, such as hidden snaps, latches, detents, ridges, magnets, etc.

The base assembly 406 and/or the upper cover 402 may be partially or entirely composed of metal, plastic, or some other material (e.g., foam). For example, in some embodiments the base assembly 406 includes a die case metal body (e.g., for strength and durability) having a smooth powder coating (e.g., for aesthetics and improved cleanability), while in other embodiments the base assembly 406 includes a recyclable (i.e., disposable) plastic body that is not intended for significant durations of use (e.g., months or years). Those skilled in the art will recognize that any suitable material may be used. For example, in some embodiments plastic may be desirable because it is recyclable and resistant to the adhesives typically applied to lash fusions before fixation to an individual's natural lashes.

Moreover, the outer surfaces of the base assembly 406 and/or the upper cover 402 may be substantially smooth and continuous. Thus, the outer surfaces of these components may be substantially free of any gaps, ridges, or fasteners that would make cleaning difficult or that may inadvertently capture artificial lashes.

FIG. 4C illustrates how multiple lash fusions in a set of artificial lash extensions can be positioned within the case 400 in a specified arrangement. While the multiple lash fusions in the set of artificial lash extensions will typically not be connected to one another, the multiple lash fusions can be arranged such that the set as a whole substantially complements the shape of an eyelid. More specifically, the curvature of the multiple lash fusions may substantially match the tightline curvature of an average person. Thus, an entire set of artificial lash extensions may become substantially flush with the lash line when the set is arranged proximate to the tightline.

The predefined indentations 404 allow the lash fusions to be positioned in a specific arrangement. For example, the curvature of the outer surface of the case 400 may cause the lash fusions to be arranged in the shape of an eyelid (i.e., the outer surface of the case 400 may mimic the natural lash line). Together, the multiple lash fusions form a set of artificial lash extensions that can be collectively applied in a single motion.

Figure 5A:
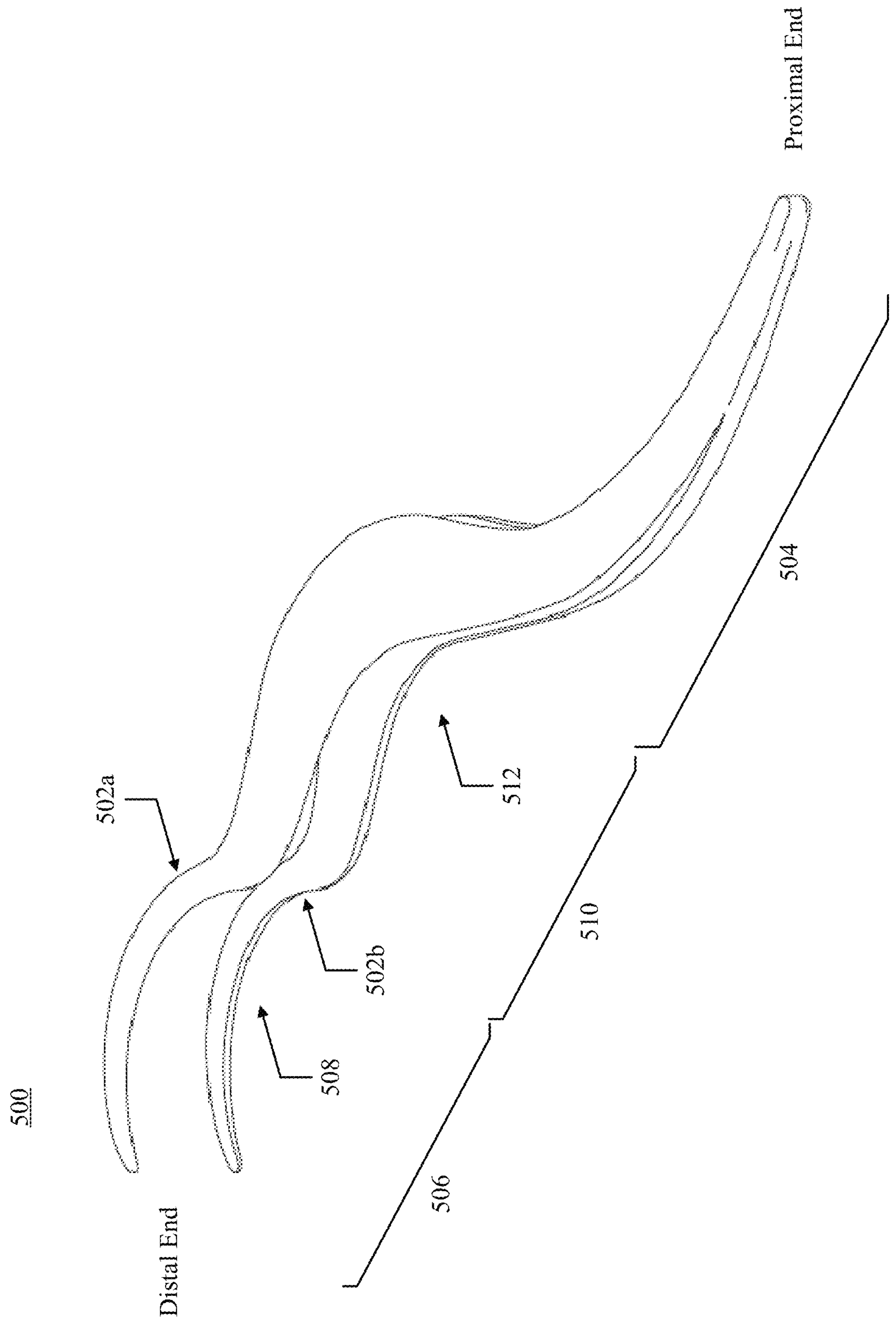
FIGS. 5A-B depict an applicator that can be used to simultaneously apply an entire set of artificial lash extensions to an individual's natural lashes.
Figure 5B:
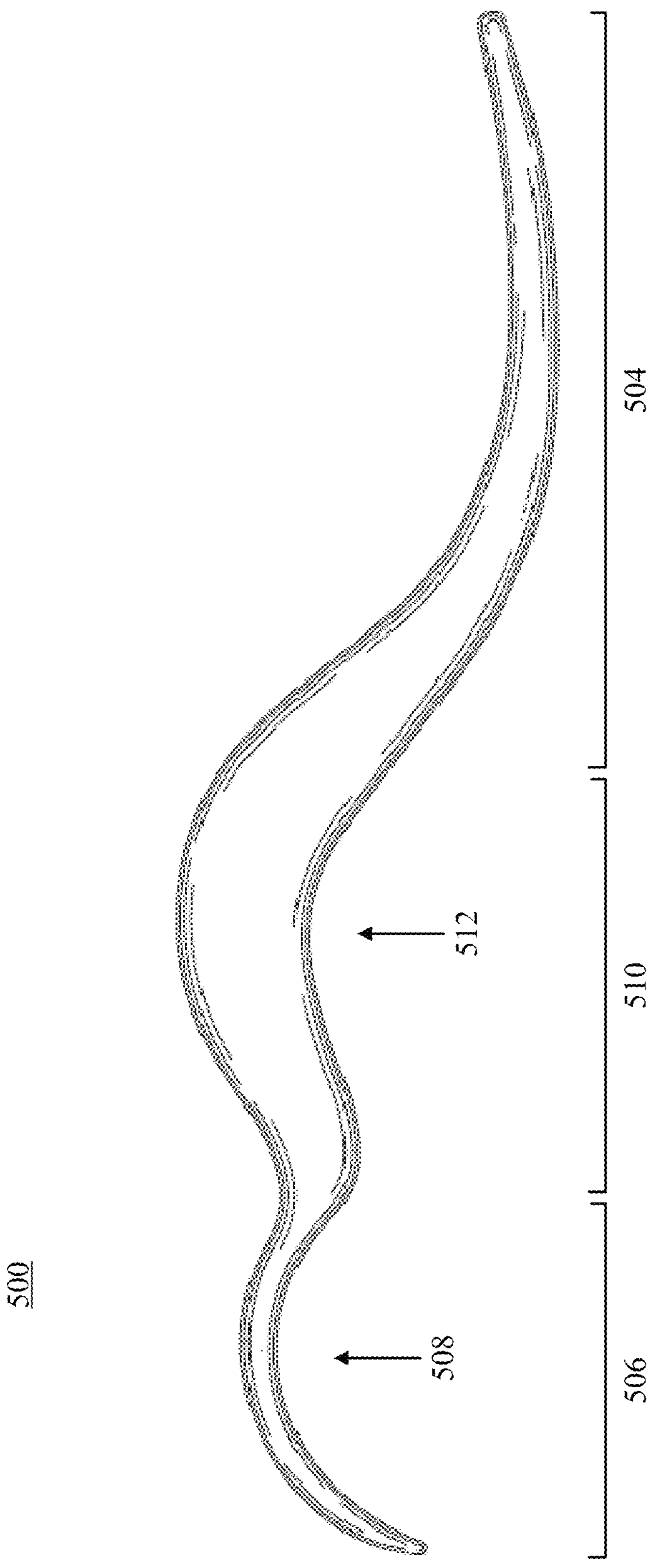

FIGS. 5A-B depict an applicator 500 that can be used to simultaneously apply an entire set of artificial lash extensions to an individual's natural lashes. FIG. 5A is a perspective view of an applicator 500 having two opposed arms, and FIG. 5B is a side view depicting the curvature of the applicator 500.

The applicator 500 includes opposed arms 502*a-b* that are connected to one another at an inner end (also referred to as a "proximal end"). Each of the opposed arms 502*a-b* can include an inner portion 504 that is gripped by an individual and an outer portion 506 that is contoured to resiliently grasp multiple lash fusions. For example, the outer portion 506 may have a concave (e.g., crescent) shape 508 that enables the applicator 500 to become substantially flush with the housing of a case (e.g., case 400 of FIGS. 4A-C) and the tightline of an eye. This non-linear shape enables the individual to readily grasp and apply an entire set of artificial lash extensions without requiring assistance from another individual (e.g., a medical professional or cosmetician).

In some embodiments, the middle portion 510 (also referred to as the "bridge) of the applicator 500 includes another concave shape 512 (also referred to as a "hump") that allows the applicator 500 to rest on the individual's cheek bone, nose bridge, etc. For example, if the individual is holding the applicator 500 in their right hand, then the individual can readily apply a set of artificial lash extensions to the right eye. However, when the individual attempts to apply a set of artificial lash extensions to the left eye, the individual may to balance the hump 512 on the bridge of the nose for stabilization. During the application process, the individual may grasp the inner portion 504 and/or the middle portion 510.

The applicator 500 can be composed of metal, plastic, or any other suitable material. Metal alloys (e.g., stainless steel) are typically preferred because they provide greater durability and allow the applicator 500 to have high precision. The term "precision" refers to the size of objects that can be grasped by the applicator 500. Highly precise grasping tools (e.g., tweezers) can grab very small objects. In order to have high precision, the opposed arms 502*a-b* must be precisely aligned and balanced so that an individual can grasp individual artificial lashes.

Figure 6A:
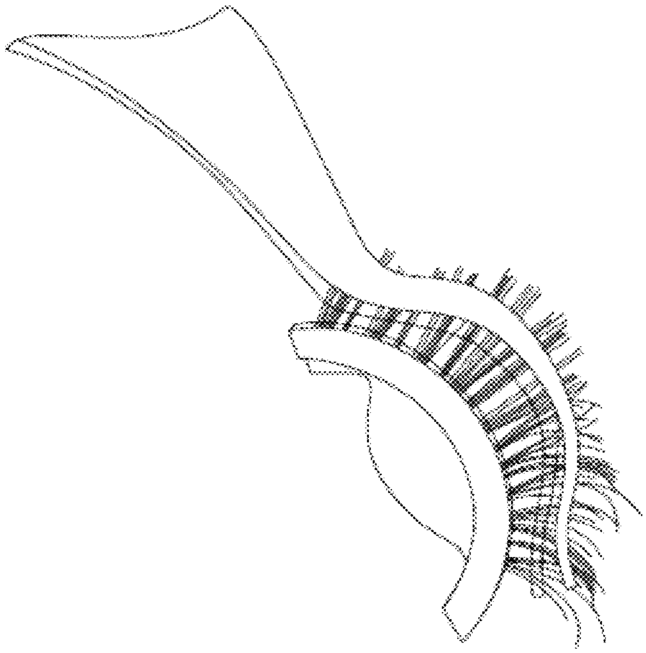
FIGS. 6A-B depict how the concave shape of the outer portions of an applicator enables an individual to simultaneously grasp all of the lash fusions in a set of artificial lash extensions.

The outer portions 506 of the opposed arms 502*a-b* are arranged to engage one another when the inner portions 504 of the opposed arms 502*a-b* are pressed toward one another by an individual. Such action causes pressure to be applied to the exterior surface of the inner portions 504 and/or the middle portions 510 of the opposed arms 502*a-b*. FIG. 6A depicts how the arrangement of a set of artificial lash extensions enables all of the lash fusions to be simultaneously grasped by an applicator. More specifically, an individual or a healthcare professional, such as a lash technician or cosmetician, can grasp an entire set of artificial lash extensions using the applicator, and then simultaneously apply the entire set of artificial lash extensions to the individual's natural lashes in a single motion.

Figure 6B:
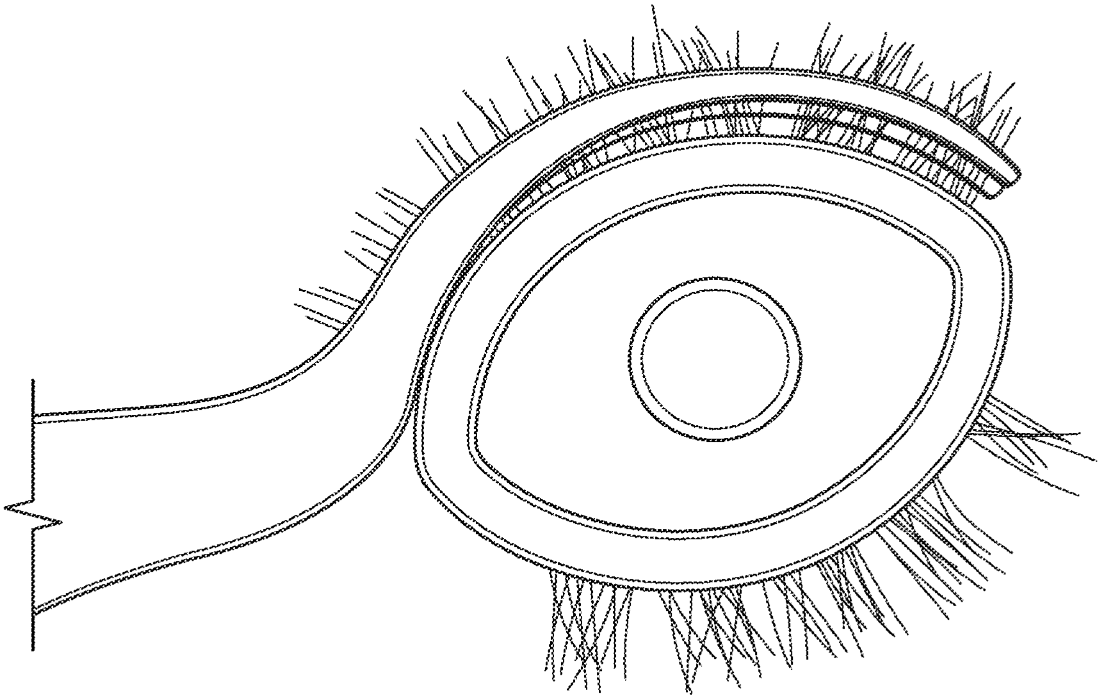

FIG. 6B depicts how the concave shape of an applicator can substantially complement the convex shape of a case. The concave shape of the applicator enables an individual to simultaneously grasp all of the lash fusions in a set of artificial lash extensions housed within the case. After grasping the set of artificial lash extensions, the individual can apply the entire set of artificial lash extensions to the natural lashes in a single motion.

The individual may also exploit the concave shape of the applicator to apply pressure to the multiple lash fusions to ensure that each lash fusion is securely attached to the natural lashes. For example, after applying the set of artificial lash extensions to the underside of the natural lashes, the individual can apply pressure another time to clamp down on the natural lashes and the artificial lash extensions. While the second application of pressure may not be necessarily, the individual may perform such action to ensure adherence of the lash fusions to the natural lashes.

In some embodiments, one or both of the opposed arms include a knurl at the outer end that can be used to aid in grasping. However, the knurl(s) must be offset from one another so that the outer portions of the opposed arms can be pressed against one another. Embodiments may also include a ridge that extends around some or all of the periphery of each opposed arm Although the term "individual" is generally used to refer to a person who applies sets of lash extensions to herself, those skilled in the art will recognize the technology described herein can also be used by healthcare professionals, cosmeticians, etc.

Figure 7:
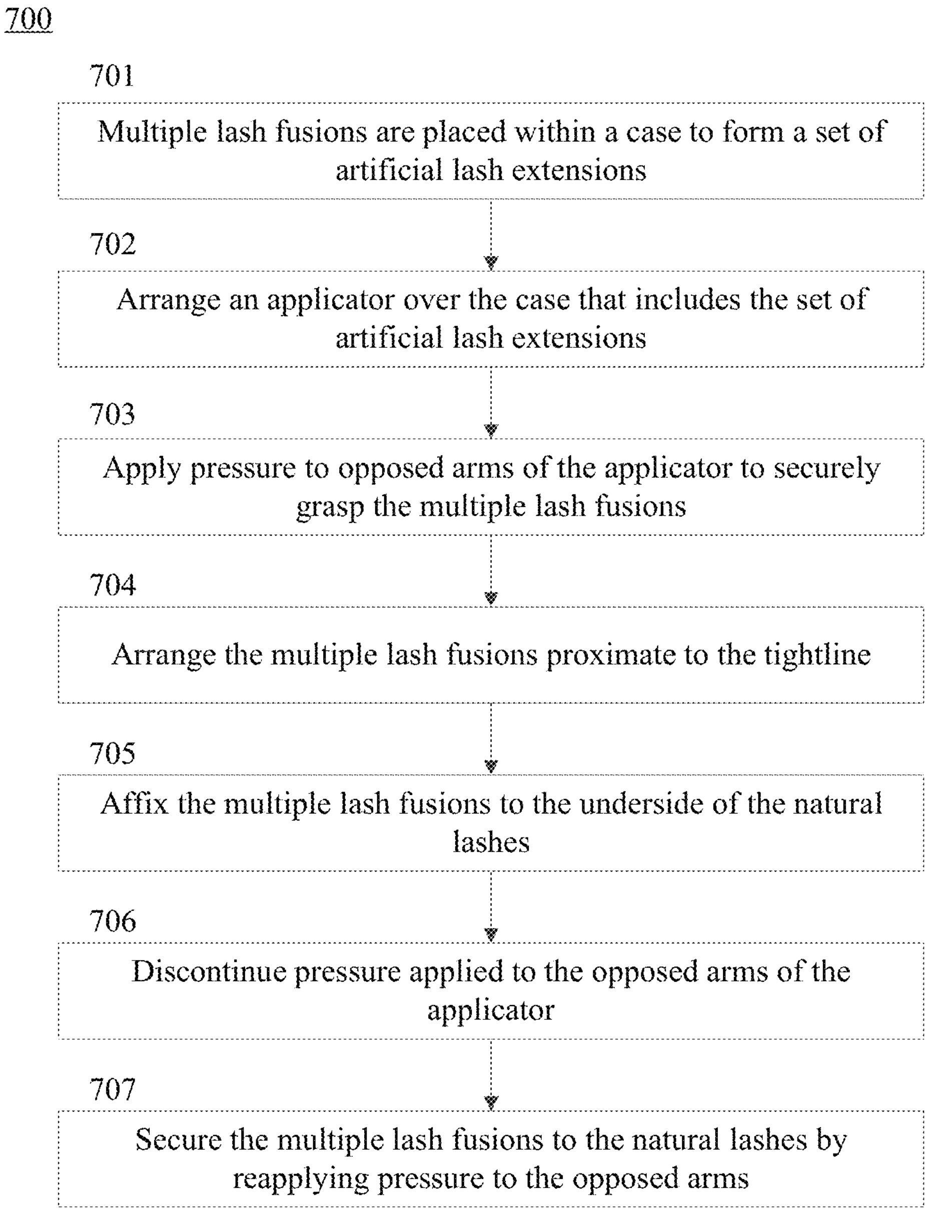
FIG. 7 depicts a flow diagram of a process for applying multiple lash fusions included in a set of artificial lash extensions.

FIG. 7 depicts a flow diagram of a process 700 for applying a set of artificial lash extensions to an individual's natural lashes. Multiple lash fusions are initially placed within a case to form a set of artificial lash extensions (step 701). As noted above, the multiple fusions may be positioned in a specific arrangement. For example, the case may include predefined indentations that cause the multiple lash fusions to be arranged in a convex pattern similar to the shape of an eyelid.

The individual can then arrange an applicator over the case that includes the set of artificial lash extensions (step 702). The applicator includes opposed arms having concave outer portions that substantially complement the convex pattern of lash fusions included in the set, as well as the convex outer surface of the case. The individual can then apply pressure to the opposed arms of the applicator to securely grasp the multiple lash fusions (step 703). Application of such pressure causes the outer portions of the opposed arms to engage one another and grasp each lash fusion included in the set.

The individual arranges the multiple lash fusions proximate to the tightline (step 704), and then attaches the multiple lash fusions to the natural lashes (step 705) by pressing the multiple lash fusions upward against the bottom of the natural eyelashes. Thus, the set of lash fusions may become substantially flush with the lash line. The initial application process can then be completed by discontinuing the pressure applied to the opposed arms of the applicator (step 706). In some embodiments, the individual may further secure the multiple lash fusions to the natural lashes by once again applying pressure to the opposed arms of the application (step 707), which causes the outer portions of the opposed arms to clamp down on the multiple lash fusions and the natural lashes.

Unless contrary to physical possibility, it is envisioned that the steps described above may be performed in various sequences and combinations. For instance, the case may already include the multiple lash fusions before corning into the possession of the individual (thus rendering step 701 unnecessary in some embodiments).

Other steps could also be included in some embodiments. For example, an adhesive may be applied to the top of each lash fusion in the set of artificial lash extensions. In other embodiments, ad adhesive is applied to the top of each lash fusion in the set of artificial lash extensions during the manufacturing process. The adhesive could be a waterproof glue or mascara. For example, the adhesive may include an oil-soluble polymer that helps to enhance adhesion and substantivity of the artificial lash extensions to the individual's natural lashes. The adhesive may be a waterproof formulation that allows the set of artificial lash extensions to remain affixed to the individual's natural lashes for longer periods of time.

Although latex-based adhesives are generally avoided to avoid irritation of the individual's eyelid (e.g., due to an allergic reaction), adhesives can include various other natural ingredients (e.g., sugar or honey) and/or chemical ingredients. For example, copolymer is often a main ingredient in many adhesive formulations. The adhesive could be a commercially-available adhesive for conventional lash extensions or a specialized composition for use with the set of lash extensions described herein. The adhesive could be clear or colored (e.g., milky white or black to emulate mascara).

Figure 8:
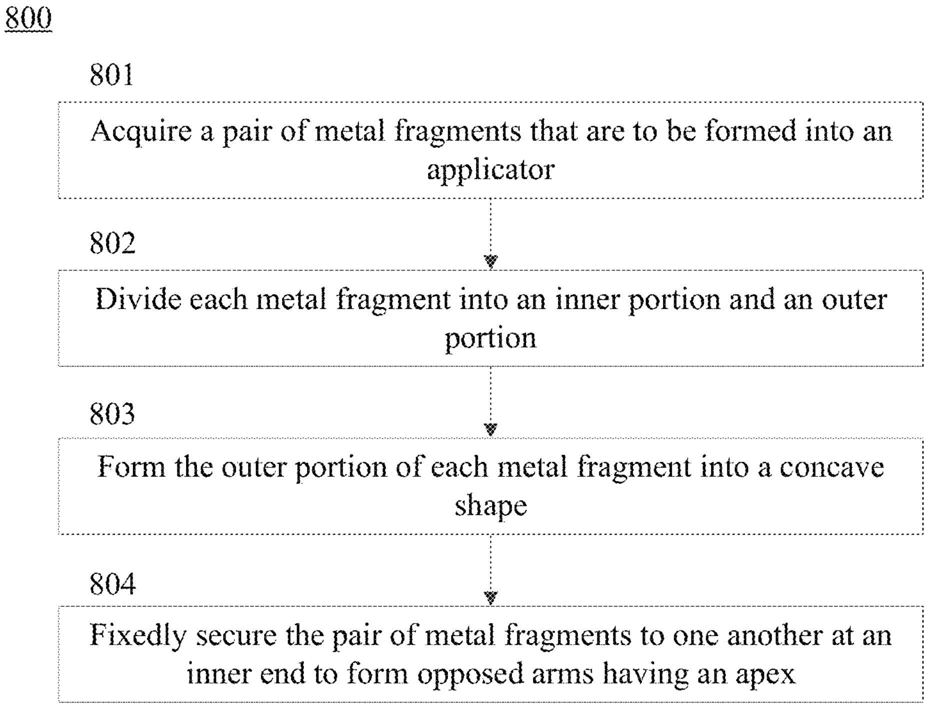
FIG. 8 depicts a flow diagram for a process for manufacturing applicators for applying artificial lash extensions.

FIG. 8 depicts a flow diagram for a process 800 for manufacturing applicators for applying artificial lash extensions. A pair of metal fragments are initially acquired that are to be formed into an applicator for applying artificial lash extensions (step 801). Generally, the metal fragments is comprised of a metal for improved durability, cleanability, etc. Examples of metals include titanium, hardened steel, stainless steel, etc.

Other materials may also be used to form the applicator. For example, the pair of fragments may be comprised of plastic, glass, foam, etc. Moreover, the applicator may be formed from a single piece of material rather than a pair of separate fragments. In such embodiments, the single piece of material can be formed into a v-shaped body having opposed arms and an apex (e.g., through the application of heat to a central point at which the single piece of material is folded).

Each metal fragment can be logically divided into an inner portion designed to be gripped by an individual and an outer portion designed to grasp a set of artificial lash extensions (step 802). For example, the outer portion of each metal fragment may be wide enough to simultaneously grasp 4-8 clusters of artificial lashes. In some embodiments, the metal fragments may be slightly thinner at the proximal end (also referred to as the "gripping end") in order to provide greater flexibility.

The outer portion of each metal fragment is then formed into a concave shape that may substantially match the tightline curvature of an eyelid (step 803). Said another way, the outer portion of each metal fragment may be contoured to match the curvature of the tightline of an eyelid. This can be accomplished, for example, using appropriately shaped die blocks and machine molding. Such a design enables an individual to simultaneously grasp and apply multiple lash fusions without requiring assistance from another individual (e.g., a medical professional or cosmetician).

In some embodiments, a middle portion of each metal fragment is also formed into a concave shape that allows the applicator to rest on the cheek bone, nose bridge, etc. For example, if an individual is holding the applicator in their right hand, then the individual can readily apply a set of artificial lash extensions to the right eye. However, when the individual attempts to apply a set of artificial lash extensions to the left eye, the individual may to balance the middle portion on the bridge of the nose for stabilization.

The pair of metal fragments can then be fixedly secured to one another at the proximal end to form opposed arms having an apex (step 804). For example, an individual may use an induction welder to fuse the pair of metal fragments together at the proximal end. This arrangement of the opposed arms allows an individual to securely grasp lash fusion(s) by applying pressure to the opposed arms. Forming the applicator in such a manner also ensures that the opposed arms naturally revert or "spring" back to their original position when pressure is no longer being applied by the individual.

In some embodiments, the applicator is treated (e.g., by being powder coated) to improve durability, resistance to scratching, cleanability, resistance to chemicals/solutions, etc. For example, the outer portion of each metal fragment may have a non-stick to avoid stickiness. Examples of non-stick coatings include polytetrafluoroethylene (PTFE) coatings, silicone coatings, etc. Upon being completed, the applicator can be used by an individual to simultaneously grasp and apply a set of artificial lash extensions by applying pressure to the opposed arms.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

What is claimed is:

1. A kit comprising:

a plurality of artificial lash extensions that attach to an underside of natural eyelashes using an adhesive and in an arrangement adjacent to one another;

a storage case designed to releasably hold the plurality of artificial lash extensions; and an applicator comprising a pair of opposing arms that are joined to each other at a proximal end of each arm, each arm comprising:

a first section comprising the proximal end of the arm;

a second section positioned between and connected to the first section and a third section of the arm; and the third section comprising a first end portion and a second end portion, the third section defining a curvature between the first end portion and the second end portion, the third sections of the applicator designed to grasp an artificial lash extension of the plurality of artificial lash extensions from the storage case and attach the artificial lash extension to the underside of the natural eyelashes.

2. The kit of claim 1, further comprising:

the adhesive to apply to the underside of the natural eyelashes.

3. The kit of claim 2, wherein the adhesive comprises a cyanoacrylate.

4. The kit of claim 1, wherein the storage case comprises:

a plurality of indentations designed hold the plurality of artificial lash extensions.

5. The kit of claim 4, wherein the storage case further comprises:

an outer sidewall having a curved surface that forms an exterior surface of the storage case.

6. The kit of claim 5, wherein the plurality of indentations extend inward from the curved surface of the outer sidewall and extend vertically toward a top portion of the storage case.

7. The kit of claim 6, wherein each indentation of the plurality of indentations comprises a substantially flat surface that extends inward from the curved surface.

8. The kit of claim 5, wherein the plurality of artificial lash extensions seated in the plurality of indentations are arranged in a shape of a natural lash line.

9. The kit of claim 5, wherein the curvature of the applicator corresponds to the curved surface of the outer sidewall.

10. The kit of claim 1, wherein at least part of the first end portion of the third section of the applicator forms a tip of the applicator.

11. The kit of claim 10, the first section, the second section and the third section longitudinally extend towards the tip.

12. The kit of claim 1, wherein the curvature of the applicator comprises a convex curvature.

13. The kit of claim 12, wherein the convex curvature of the third section is contoured to align substantially flush with a shape of a tightline of a user.

14. The kit of claim 12, wherein the applicator comprises an additional curvature opposite the convex curvature.

15. The kit of claim 14, wherein the additional curvature comprises a concave curvature.

16. The kit of claim 1, wherein the third sections of the applicator are designed to grasp the plurality of artificial lash extensions from the storage case and attach the plurality of artificial lash extension to the underside of the natural eyelashes.

* * * * *